United States Patent
Wang et al.

(10) Patent No.: US 11,917,182 B2
(45) Date of Patent: Feb. 27, 2024

(54) HYPOTHETICAL REFERENCE DECODER FOR V-PCC

(71) Applicant: Huawei Technologies Co., Ltd., Guangdong (CN)

(72) Inventors: Ye-Kui Wang, San Diego, CA (US); Jianle Chen, San Diego, CA (US); Fnu Hendry, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

(21) Appl. No.: 17/562,760

(22) Filed: Dec. 27, 2021

(65) Prior Publication Data

US 2022/0124359 A1    Apr. 21, 2022

Related U.S. Application Data

(63) Continuation of application No. PCT/US2020/039360, filed on Jun. 24, 2020.
(Continued)

(51) Int. Cl.
*H04N 7/12*    (2006.01)
*H04N 19/46*   (2014.01)
(Continued)

(52) U.S. Cl.
CPC ........... *H04N 19/46* (2014.11); *H04N 19/102* (2014.11); *H04N 19/172* (2014.11); *H04N 19/597* (2014.11)

(58) Field of Classification Search
CPC .... H04N 19/46; H04N 19/102; H04N 19/172; H04N 19/597; H04N 19/423;
(Continued)

(56) References Cited

U.S. PATENT DOCUMENTS 9,479,774 B2 * 10/2016 Wang ................... H04N 19/31
2014/0003489 A1 * 1/2014 Hannuksela ........ H04N 19/187
375/240.02
(Continued)

FOREIGN PATENT DOCUMENTS

JP    2016526351 A    9/2016
JP    2019041402 A    3/2019

OTHER PUBLICATIONS

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.
(Continued)

*Primary Examiner* — Gims S Philippe
(74) *Attorney, Agent, or Firm* — Conley Rose, P.C.

(57) ABSTRACT

A video coding mechanism is disclosed. The mechanism includes encoding a sequence of point cloud compression (PCC) components into a bitstream. A buffering period supplemental enhancement information (SEI) message is also encoded into the bitstream. A hypothetical reference decoder (HRD) is initialized at a coded atlas access unit (AU) associated with the buffering period SEI message. A HRD conformance check of the bitstream is performed starting at the coded atlas AU. The bitstream is stored for communication toward a decoder.

19 Claims, 13 Drawing Sheets

Related U.S. Application Data

(60) Provisional application No. 62/867,563, filed on Jun. 27, 2019.

(51) Int. Cl.
*H04N 19/102* (2014.01)
*H04N 19/172* (2014.01)
*H04N 19/597* (2014.01)

(58) Field of Classification Search
CPC .. H04N 19/44; H04N 19/70; H04N 21/23614; H04N 21/2353
USPC .................................................. 375/240.26
See application file for complete search history.

(56) References Cited

U.S. PATENT DOCUMENTS

| | | | |
|---|---|---|---|
| 2014/0355692 | A1 | 12/2014 | Ramasubramonian et al. |
| 2015/0208095 | A1 | 7/2015 | Schierl et al. |
| 2015/0358640 | A1 | 12/2015 | Hendry et al. |
| 2017/0347100 | A1 | 11/2017 | Chou |
| 2018/0268570 | A1* | 9/2018 | Budagavi ............... G06T 9/001 |
| 2022/0036595 | A1* | 2/2022 | Sugio .................. H04N 19/597 |
| 2022/0217314 | A1* | 7/2022 | Oh ........................ H04N 21/44 |

OTHER PUBLICATIONS

"High Efficiency Video Coding," Series H: Audiovisual and Multimedia Systems Infrastructure of Audiovisual Services—Coding of Moving Video, ITU-T H.265, Dec. 2018, 664 pages.

"Line Transmission of Non-Telephone Signals, Video Codec for Audiovisual Services at p x 64 kbits," ITU-T Recommendation H.261, Mar. 3, 1993, 29 pages.

"Transmission of Non-Telephone Signals, Information Technology—Generic Coding of Moving Pictures and Associated Audio Information: Video," ITU-T H.262, Jul. 1995, 211 pages.

"Video Coding for Low Bit Rate Communication," Series H: Auddiovisual and Multimedia Systems Infrastructure of Audiovisual Services—Coding of Moving Video, ITU-T H.263, Jan. 2005, 226 pages.

Bross, et al., "Versatile Video Coding," Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v9, 407 pages.

Chen, et al., "Algorithm description for Versatile Video Coding and Test Model 5 (VTM 5)," JVET-N1002-v2, WG 11 MPEG Joint Video Coding Team(s) with ITU-T SG 16, 14th Meeting: Geneva, CH, Mar. 19-27, 2019, 79 pages.

Jang, E, et al., "Video-Based Point-Cloud-Compression Standard in MPEG: From Evidence Collection to Committee Draft," Standards in Nutshell, IEEE Signal Processing Magazine, IEEE, Apr. 26, 2019 vol. 36, No. 3, pp. 118-123.

Deshpande, S., et al., "An Improved Hypothetical Reference Decoder for HEVC," Visual Information Processing and Communication IV, SPIE, Feb. 21, 2013, vol. 8666, pp. 1-9.

Webb, J., "HRD Conformance for Real-Time H.264 Video Encoding," IEEE International Conference on Image Processing 2007, IEEE, Nov. 12, 2007, vol. V, pp. 305-308.

Graziosi, D., et al., "V-PCC Component Synchronization for Point Cloud Reconstruction," IEEE 22nd International Workshop on Multimedia Signal Processing 2020, IEEE, Dec. 16, 2020, pp. 1-5.

\* cited by examiner

HYPOTHETICAL REFERENCE DECODER FOR V-PCC

CROSS-REFERENCE TO RELATED APPLICATIONS

This patent application is a continuation of International Application No. PCT/US2020/039360, filed Jun. 24, 2020 by Ye-Kui Wang, et. al., and titled "Hypothetical Reference Decoder For V-PCC," which claims the benefit of U.S. Provisional Patent Application No. 62/867,563, filed Jun. 27, 2019 by Ye-Kui Wang, and titled "High-Level Syntax Improvements For Video-Based Point Cloud Compression," which is hereby incorporated by reference in its entirety.

TECHNICAL FIELD

The present disclosure is generally related to video coding, and is specifically related to improvements to support hypothetical reference decoder (HRD) conformance testing in Video Point Cloud Coding (V-PCC).

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in an encoder, the method comprising: encoding into a bitstream, by a processor of the encoder, a buffering period supplemental enhancement information (SEI) message and a sequence of point cloud compression (PCC) components; initializing, by the processor, a hypothetical reference decoder (HRD) at a coded atlas access unit (AU) associated with the buffering period SEI message; and performing, by the processor, a HRD conformance check of the bitstream starting at the coded atlas AU.

Video PCC is a mechanism for efficiently coding a three dimensional objects represented by a cloud of points of varying color. The point cloud is captured over time and included in PCC components. The PCC components are then encoded. The position of each valid point in the cloud at a time instance is stored as a geometry map in a geometry frame. The colors are stored as patches. Specifically, the patches at an instant in time are packed into an atlas frame. The patches generally do not cover the entire atlas frame. Accordingly, occupancy frames are also generated that indicate which portions of atlas frame contain patch data. Optionally, attributes of the points, such as transparency, may be included in an attribute frame. As such, each PCC frame can be encoded as a plurality of frames containing different components describing the point cloud at a corresponding instant. Further, different components may be coded by employing different coding and decoding (codec) systems. Codec systems may employ a hypothetical reference decoder (HRD). The HRD is a component that operates at an encoder. The HRD receives an encoded bitstream and checks the bitstream for conformance with a corresponding coding standard. A bitstream that passes a HRD conformance test/check should be decodable by any decoder that also conforms to the coding standard. PCC systems may not be configured to employ a HRD, which may cause interoperability problems when attempting to decode PCC components.

The present example includes mechanisms to implement a HRD in a PCC system. The encoder may encode a buffering period SEI message into the bitstream. The buffering period SEI message is associated with an AU containing a coded atlas frame. Hence, the HRD can be initialized and begin conformance testing at the atlas frame based on the buffering period SEI message. Further, the encoder can encode HRD parameters into the bitstream. The HRD parameters can indicate the type of conformance tests to be performed. A type I conformance test indicates the HRD should check decode and check each of the components of the coded PCC frame for conformance. A type II conformance test indicates that HRD should completely reconstruct the point cloud from the various components and check the reconstructed point cloud for conformance. Further, the encoder can encode an atlas frame timing message into the bitstream, which indicates delays related to a coded atlas buffer (CAB) in the HRD. The HRD can use this information to remove components from the buffer at a predetermined rate. The HRD can then determine conformance if the HRD is able to decode the components without buffer under-runs or over-runs when the components are removed from the buffer at the predetermined rate. As such, the examples provide sufficient data to initialize and operate an HRD conformance test on a PCC video. The decoder can then decode any PCC video that has passed an HRD conformance test. Hence, the present example reduces errors and increases functionality at both an encoder and decoder. Further, the present disclosure supports mechanisms to increase coding efficiency, and hence supports a reduction in processor, memory, and/or network resource usage at an encoder and/or a decoder.

Optionally, in any of the preceding aspects, another implementation of the aspect provides, further comprising encoding, by the processor, hypothetical reference decoder (HRD) parameters into the bitstream.

Optionally, in any of the preceding aspects, another implementation of the aspect provides, further comprising selecting, by the processor, a conformance point for the HRD conformance check at the HRD based on the HRD parameters.

Optionally, in any of the preceding aspects, another implementation of the aspect provides, wherein the HRD conformance check is performed on decompressed attribute components, decompressed atlas components, decompressed occupancy map components, and decompressed geometry components of the PCC components when a first type of conformance point is selected based on the HRD parameters.

Optionally, in any of the preceding aspects, another implementation of the aspect provides, wherein the HRD conformance check is performed on reconstructed point clouds from the PCC components when a second type of conformance point is selected based on the HRD parameters.

Optionally, in any of the preceding aspects, another implementation of the aspect provides, further comprising encoding, by the processor, an atlas frame timing SEI message into the bitstream.

Optionally, in any of the preceding aspects, another implementation of the aspect provides, further comprising removing, by the processor, decoding units from a CAB in the HRD during the HRD conformance check as specified by the atlas frame timing SEI message.

Optionally, in any of the preceding aspects, another implementation of the aspect provides, further comprising setting an output delay of a decoded atlas buffer (DAB) in the HRD as specified by the atlas frame timing SEI message.

Optionally, in any of the preceding aspects, another implementation of the aspect provides, wherein the decoding units are removed from the CAB in the HRD during the HRD conformance check based on an initial delay specified by the buffering period SEI message.

In an embodiment, the disclosure includes a method implemented in a decoder, the method comprising: receiving, by a receiver of the decoder, a bitstream comprising a plurality of coded sequences of PCC components and a buffering period SEI message; and decoding, by a processor of the decoder, the PCC components starting from a coded atlas access unit indicated by the buffering period SEI message.

Video PCC is a mechanism for efficiently coding a three dimensional objects represented by a cloud of points of varying color. The point cloud is captured over time and included in PCC components. The PCC components are then encoded. The position of each valid point in the cloud at a time instance is stored as a geometry map in a geometry frame. The colors are stored as patches. Specifically, the patches at an instant in time are packed into an atlas frame. The patches generally do not cover the entire atlas frame. Accordingly, occupancy frames are also generated that indicate which portions of atlas frame contain patch data. Optionally, attributes of the points, such as transparency, may be included in an attribute frame. As such, each PCC frame can be encoded as a plurality of frames containing different components describing the point cloud at a corresponding instant. Further, different components may be coded by employing different coding and decoding (codec) systems. Codec systems may employ a hypothetical reference decoder (HRD). The HRD is a component that operates at an encoder. The HRD receives an encoded bitstream and checks the bitstream for conformance with a corresponding coding standard. A bitstream that passes a HRD conformance test/check should be decodable by any decoder that also conforms to the coding standard. PCC systems may not be configured to employ a HRD, which may cause interoperability problems when attempting to decode PCC components.

The present example includes mechanisms to implement a HRD in a PCC system. The encoder may encode a buffering period SEI message into the bitstream. The buffering period SEI message is associated with an AU containing a coded atlas frame. Hence, the HRD can be initialized and begin conformance testing at the atlas frame based on the buffering period SEI message. Further, the encoder can encode HRD parameters into the bitstream. The HRD parameters can indicate the type of conformance tests to be performed. A type I conformance test indicates the HRD should check decode and check each of the components of the coded PCC frame for conformance. A type II conformance test indicates that HRD should completely reconstruct the point cloud from the various components and check the reconstructed point cloud for conformance. Further, the encoder can encode an atlas frame timing message into the bitstream, which indicates delays related to a coded atlas buffer (CAB) in the HRD. The HRD can use this information to remove components from the buffer at a predetermined rate. The HRD can then determine conformance if the HRD is able to decode the components without buffer under-runs or over-runs when the components are removed from the buffer at the predetermined rate. As such, the examples provide sufficient data to initialize and operate an HRD conformance test on a PCC video. The decoder can then decode any PCC video that has passed an HRD conformance test. Hence, the present example reduces errors and increases functionality at both an encoder and decoder. Further, the present disclosure supports mechanisms to increase coding efficiency, and hence supports a reduction in processor, memory, and/or network resource usage at an encoder and/or a decoder.

Optionally, in any of the preceding aspects, another implementation of the aspect provides, wherein the buffering period SEI message comprises an initial delay for removing decoding units from a CAB in a HRD.

Optionally, in any of the preceding aspects, another implementation of the aspect provides, wherein the bitstream further comprises HRD parameters.

Optionally, in any of the preceding aspects, another implementation of the aspect provides, wherein the HRD parameters specify a conformance point for a HRD conformance check at the HRD.

Optionally, in any of the preceding aspects, another implementation of the aspect provides, wherein the conformance point indicates whether the HRD conformance check is performed on decompressed PCC components or reconstructed point clouds.

Optionally, in any of the preceding aspects, another implementation of the aspect provides, wherein the bitstream further comprises an atlas frame timing SEI message.

Optionally, in any of the preceding aspects, another implementation of the aspect provides, wherein the atlas frame timing SEI message specifies parameters for removing decoding units from a CAB in a HRD.

In an embodiment, the disclosure includes an video coding device comprising: a processor, a receiver coupled to the processor, a memory coupled to the processor, and a transmitter coupled to the processor, wherein the processor, receiver, memory, and transmitter are configured to perform the method of any of the preceding aspects.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

In an embodiment, the disclosure includes a decoder comprising: a receiving means for receiving a bitstream comprising a plurality of coded sequences of PCC components and a buffering period SEI message; a decoding means for decoding the PCC components starting from a coded atlas access unit indicated by the buffering period SEI message; and a forwarding means for forwarding reconstructed point clouds from the PCC components for display.

Optionally, in any of the preceding aspects, another implementation of the aspect provides, wherein the decoder is further configured to perform the method of any of the preceding aspects.

In an embodiment, the disclosure includes an encoder comprising: an encoding means for encoding into a bitstream a buffering period SEI message and a sequence of PCC components; an initializing means for initializing a HRD at a coded atlas AU associated with the buffering period SEI message; a HRD means for performing a HRD conformance check of the bitstream starting at the coded atlas AU; and a storing means for storing the bitstream for communication toward a decoder.

Optionally, in any of the preceding aspects, another implementation of the aspect provides, wherein the encoder is further configured to perform the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
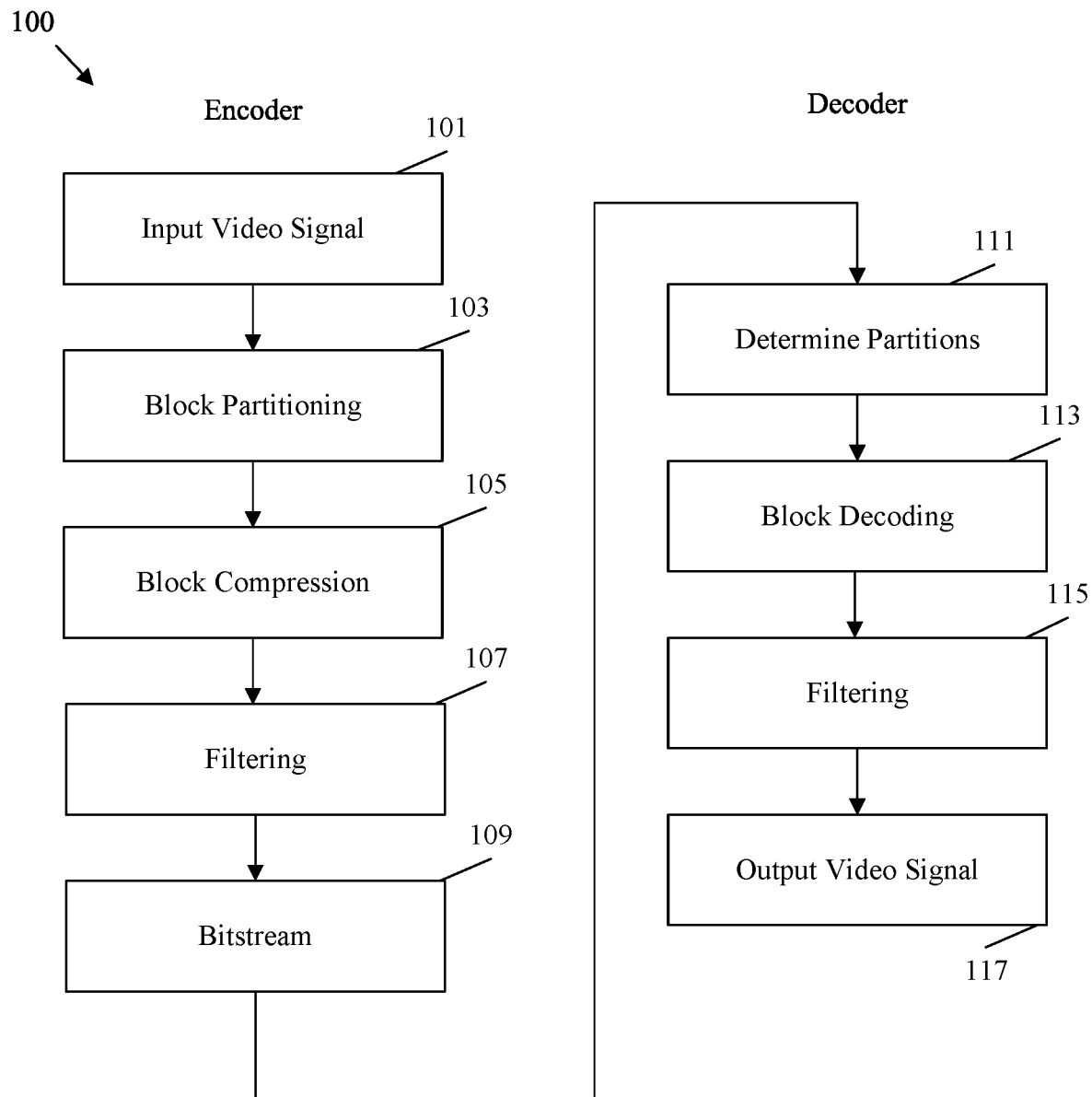
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following terms are defined as follows unless used in a contrary context herein. Specifically, the following definitions are intended to provide additional clarity to the present disclosure. However, terms may be described differently in different contexts. Accordingly, the following definitions should be considered as a supplement and should not be considered to limit any other definitions of descriptions provided for such terms herein.

An encoder is a device that is configured to employ encoding processes to compress video data into a bitstream. A decoder is a device that is configured to employ decoding processes to reconstruct video data from a bitstream for display. A point cloud/point cloud representation is a group of points (e.g., samples) in three dimensional (3D) space, where each point may contain a position, a color, and/or attribute(s). A bitstream is a sequence of bits including video data that is compressed for transmission between an encoder and a decoder. In a Point Cloud Coding (PCC) context, a bitstream includes a sequence of bits of coded video point cloud compression (V-PCC) components.

A V-PCC component (or more generally a PCC component) may be atlas data, occupancy map data, geometry data, or attribute data of a particular type that is associated with a V-PCC point cloud. An atlas may be a collection of two dimensional (2D) bounding boxes (also known as patches) projected into rectangular frames that correspond to a 3D bounding box in 3D space, where each 2D bounding box/patch represents a subset of a point cloud. An occupancy map may be a 2D array corresponding to an atlas whose values indicate, for each sample position in the atlas, whether that position corresponds to a valid 3D point in the point cloud representation. A geometry map may be a 2D array created through the aggregation of the geometry information associated with each patch, where geometry information/data may be a set of Cartesian coordinates associated with a point cloud frame. An attribute may be a scalar or vector property optionally associated with each point in a point cloud such as color, reflectance, surface normal, time stamps, material identifier (ID), etc. A complete set of atlas data, occupancy maps, geometry maps, or attributes associated with a particular time instance may be referred to as an atlas frame, an occupancy map frame, a geometry frame, and an attribute frame, respectively. Atlas data, occupancy map data, geometry data, or attribute data may be components of a point cloud, and hence may be referred to as atlas components, occupancy map components, geometry components, and attribute frame components, respectively.

An access unit (AU) may be a set of network abstraction layer (NAL) units that are associated with each other according to a specified classification rule and pertain to one particular output time. A coded component may be data that has been compressed for inclusion in a bitstream. A decompressed component may be data from a bitstream or sub-bitstream that has been reconstructed as part of a decoding process or as part of a HRD conformance test. A HRD may be a decoder model operating on an encoder that checks the variability of bitstreams produced by an encoding process to verify conformance with specified constraints. A HRD conformance test/check may be a test to determine whether an encoded bitstream complies with a standard. A conformance point may be a point in a decoding/reconstruction process where a HRD performs a HRD conformance check to verify that that decompressed and/or reconstructed data complies with a standard. HRD parameters may be syntax elements that initialize and/or define operational conditions of a HRD. A supplemental enhancement information (SEI) message may be a syntax structure with specified semantics that conveys information that is not needed by decoding processes in order to determine the values of samples in decoded pictures. A buffering period SEI message may be an SEI message that contains data indicating initial removal delays related to a coded atlas buffer (CAB) in a HRD. An atlas frame timing SEI message may be an SEI message that contains data indicating a removal delay relating to a CAB and an output delay related to a decoded atlas buffer (DAB) in a HRD. A reconstructed point cloud may be a point cloud that is generated based on data from the PCC bitstream. A reconstructed point cloud should approximate the point cloud that is coded into the PCC bitstream.

A decoding unit may be any coded component from a bitstream or sub-bitstream that is stored in a buffer for decoding. A CAB may be a first-in first-out buffer in a HRD that contains coded atlas frames in decoding order for use during PCC bitstream conformance testing. A CAB removal delay may be an amount of time a component can remain in the CAB prior to removal. An initial CAB removal delay may be an amount of time a component in a first AU in a bitstream or sub-bitstream can remain in the CAB prior to removal. A DAB may be a first-in first-out buffer in a HRD that contains decoded/decompressed atlas frames in decoding order for use during PCC bitstream conformance testing. A DAB output delay may be an amount of time a decompressed/decoded component can remain in the DAB prior to being output (e.g., as part of a reconstructed point cloud).

The following acronyms are used herein, Access Unit (AU), Coded Point Cloud Sequence (CPCS), Decoded Patch Frame Buffer (DPFB), High Level Syntax (HLS), Hypothetical Reference Decoder (HRD), Intra Random Access Point (IRAP), Point Cloud Compression (PCC), Pulse Code Modulation (PCM), Patch Frame Order Count (PFOC), Patch Sequence Parameter Set (PSPS), Reference Patch Frame List (RPFL), Supplemental Enhancement Information (SEI), Sequence Parameter Set (SPS), and Video based PCC (V-PCC).

Many video compression techniques can be employed to reduce the size of video files with minimal loss of data. For example, video compression techniques can include performing spatial (e.g., intra-picture) prediction and/or temporal (e.g., inter-picture) prediction to reduce or remove data redundancy in video sequences. For block-based video coding, a video slice (e.g., a video picture or a portion of a video picture) may be partitioned into video blocks, which may also be referred to as treeblocks, coding tree blocks (CTBs), coding tree units (CTUs), coding units (CUs), and/or coding nodes. Video blocks in an intra-coded (I) slice of a picture are coded using spatial prediction with respect to reference samples in neighboring blocks in the same picture. Video blocks in an inter-coded unidirectional prediction (P) or bidirectional prediction (B) slice of a picture may be coded by employing spatial prediction with respect to reference samples in neighboring blocks in the same picture or temporal prediction with respect to reference samples in other reference pictures. Pictures may be referred to as frames and/or images, and reference pictures may be referred to as reference frames and/or reference images. Spatial or temporal prediction results in a predictive block representing an image block. Residual data represents pixel differences between the original image block and the predictive block. Accordingly, an inter-coded block is encoded according to a motion vector that points to a block of reference samples forming the predictive block and the residual data indicating the difference between the coded block and the predictive block. An intra-coded block is encoded according to an intra-coding mode and the residual data. For further compression, the residual data may be transformed from the pixel domain to a transform domain. These result in residual transform coefficients, which may be quantized. The quantized transform coefficients may initially be arranged in a two-dimensional array. The quantized transform coefficients may be scanned in order to produce a one-dimensional vector of transform coefficients. Entropy coding may be applied to achieve even more compression. Such video compression techniques are discussed in greater detail below.

To ensure an encoded video can be accurately decoded, video is encoded and decoded according to corresponding video coding standards. Video coding standards include International Telecommunication Union (ITU) Standardization Sector (ITU-T) H.261, International Organization for Standardization/International Electrotechnical Commission (ISO/IEC) Motion Picture Experts Group (MPEG)-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and three dimensional (3D) AVC (3D-AVC). HEVC includes extensions such as Scalable HEVC (SHVC), Multiview HEVC (MV-HEVC), and 3D HEVC (3D-HEVC). The joint video experts team (JVET) of ITU-T and ISO/IEC has begun developing a video coding standard referred to as Versatile Video Coding (VVC). VVC is included in a Working Draft (WD), which includes JVET-N1001-v9 and JVET-N1002-v2, which provide an algorithm description as well as an encoder-side description of VVC as well as reference software.

Video Point Cloud Compression (V-PCC) is a mechanism for efficiently coding three dimensional objects represented by a cloud of points of varying color. Specifically, V-PCC is employed to encode and/or decode such point clouds for display as part of a video sequence. The point cloud is captured over time and included in PCC frames. The PCC frames are split into PCC components, which are then encoded. The position of each valid point in the cloud at a time instance is stored as a geometry map in a geometry frame. The colors are stored as patches. Specifically, the patches at an instant in time are packed into an atlas frame. The patches generally do not cover the entire atlas frame. Accordingly, occupancy frames are also generated that indicate which portions of atlas frame contain valid patch data. Optionally, attributes of the points, such as transparency, opacity, and/or other data may be included in an attribute frame. As such, each PCC frame can be encoded as a plurality of frames containing different components describing the point cloud at a corresponding instant. Further, different components may be coded by employing different coding and decoding (codec) systems.

Codec systems may employ a HRD. The HRD is a component that operates at an encoder. The HRD receives an encoded bitstream and checks the bitstream for conformance with a corresponding coding standard. A bitstream that passes a HRD conformance test/check should be decodable by any decoder that also conforms to the coding standard. PCC systems may not be configured to employ a HRD, which may cause interoperability problems when attempting to decode PCC components for reconstruction into a reconstructed point cloud.

Disclosed herein are mechanisms to implement a HRD in a PCC system. The encoder may encode a buffering period SEI message into the PCC bitstream. The buffering period SEI message is associated with an AU containing a coded atlas frame. Hence, the HRD can be initialized and begin conformance testing at the atlas frame based on the buffering period SEI message. Further, the encoder can encode HRD parameters into the bitstream. The HRD parameters can indicate the type of conformance tests to be performed. A type I conformance test indicates the HRD (or multiple HRDs) should decode and check each of the components of the coded PCC frame for conformance. A type II conformance test indicates that HRD should completely reconstruct the point cloud from the various components and check the reconstructed point cloud for conformance. Further, the encoder can encode an atlas frame timing message into the bitstream, which indicates delays related to a coded atlas buffer (CAB) in the HRD. The HRD can use this information to remove components from the buffer at a predetermined rate. The HRD can then determine conformance if the HRD is able to decode the components without buffer under-runs or over-runs when the components are removed from the buffer at the predetermined rate. As such, the examples provide sufficient data to initialize and operate a HRD conformance test on a PCC bitstream containing a video sequence of a coded point cloud. Hence, the present disclosure reduces errors and increases functionality at both an encoder and decoder. Further, the present disclosure supports mechanisms to increase coding efficiency, and hence supports a reduction in processor, memory, and/or network resource usage at an encoder and/or a decoder.

FIG. 1 is a flowchart of an example operating method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples). In some examples, the frames may also contain depth values to support three dimensional viewing.

At step 103, the video is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty-four pixels by sixty-four pixels). The CTUs contain both luma and chroma samples. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty-three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artifacts. Once the frames are filtered, the video signal can be output to a display at step 117 for viewing by an end user.

Figure 2:
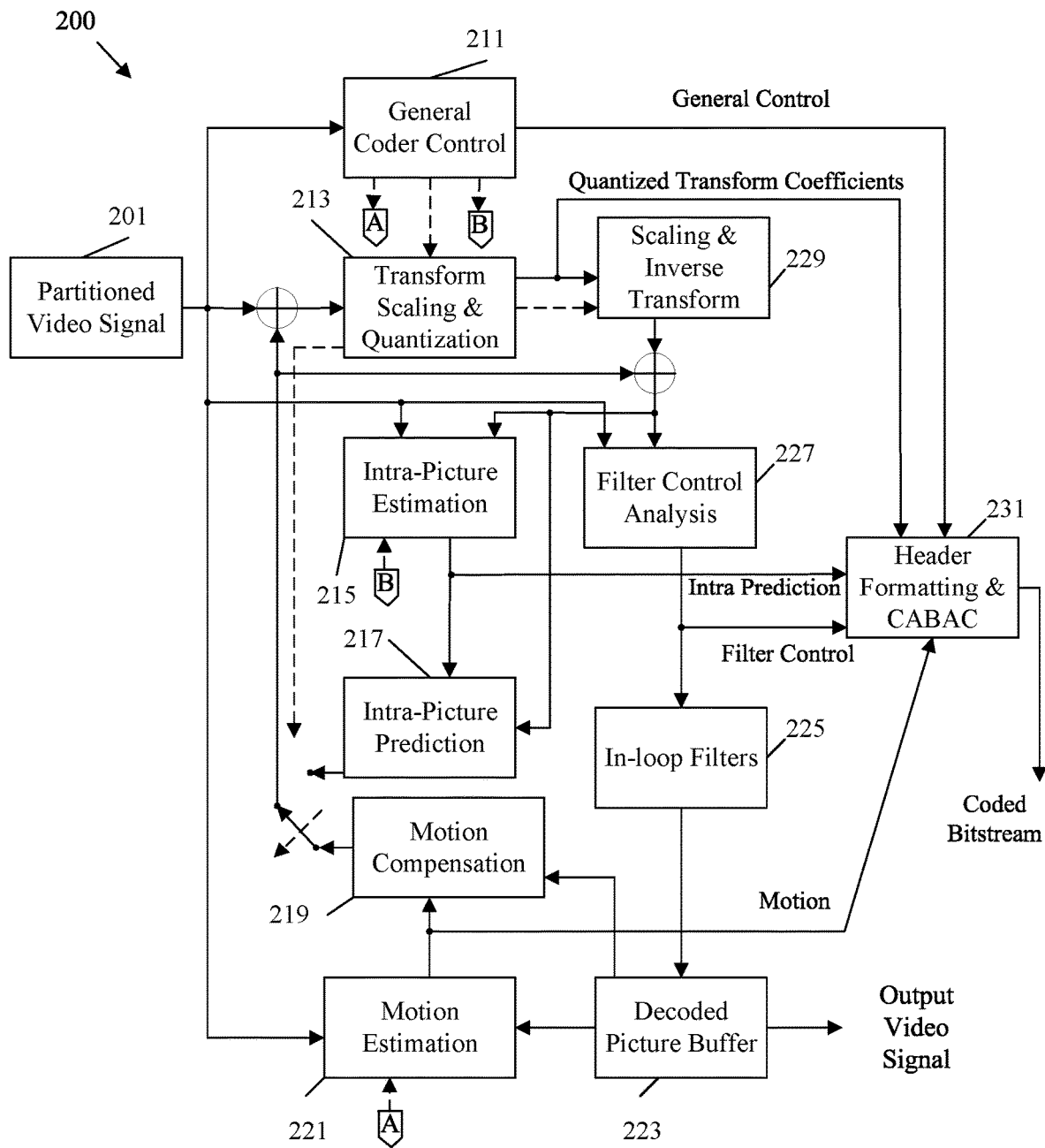
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of operating method 100. Codec system 200 is generalized to depict components employed in both an encoder and a decoder. Codec system 200 receives and partitions a video signal as discussed with respect to steps 101 and 103 in operating method 100, which results in a partitioned video signal 201. Codec system 200 then compresses the partitioned video signal 201 into a coded bitstream when acting as an encoder as discussed with respect to steps 105, 107, and 109 in method 100. When acting as a decoder, codec system 200 generates an output video signal from the bitstream as discussed with respect to steps 111, 113, 115, and 117 in operating method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel difference may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 221 generates motion vectors, PUs, and TUs by using a rate-distortion analysis as part of a rate distortion optimization process. For example, the motion estimation component 221 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 200 may calculate values for sub-integer pixel positions of reference pictures stored in decoded picture buffer component 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215 when implemented on an encoder or read the residual block from the bitstream when implemented on a decoder. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the transformed residual block from the scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 223 for later use in motion estimation as discussed above. When operating as a decoder, the decoded picture buffer component 223 stores and forwards the reconstructed and filtered blocks toward a display as part of an output video signal. The decoded picture buffer component 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
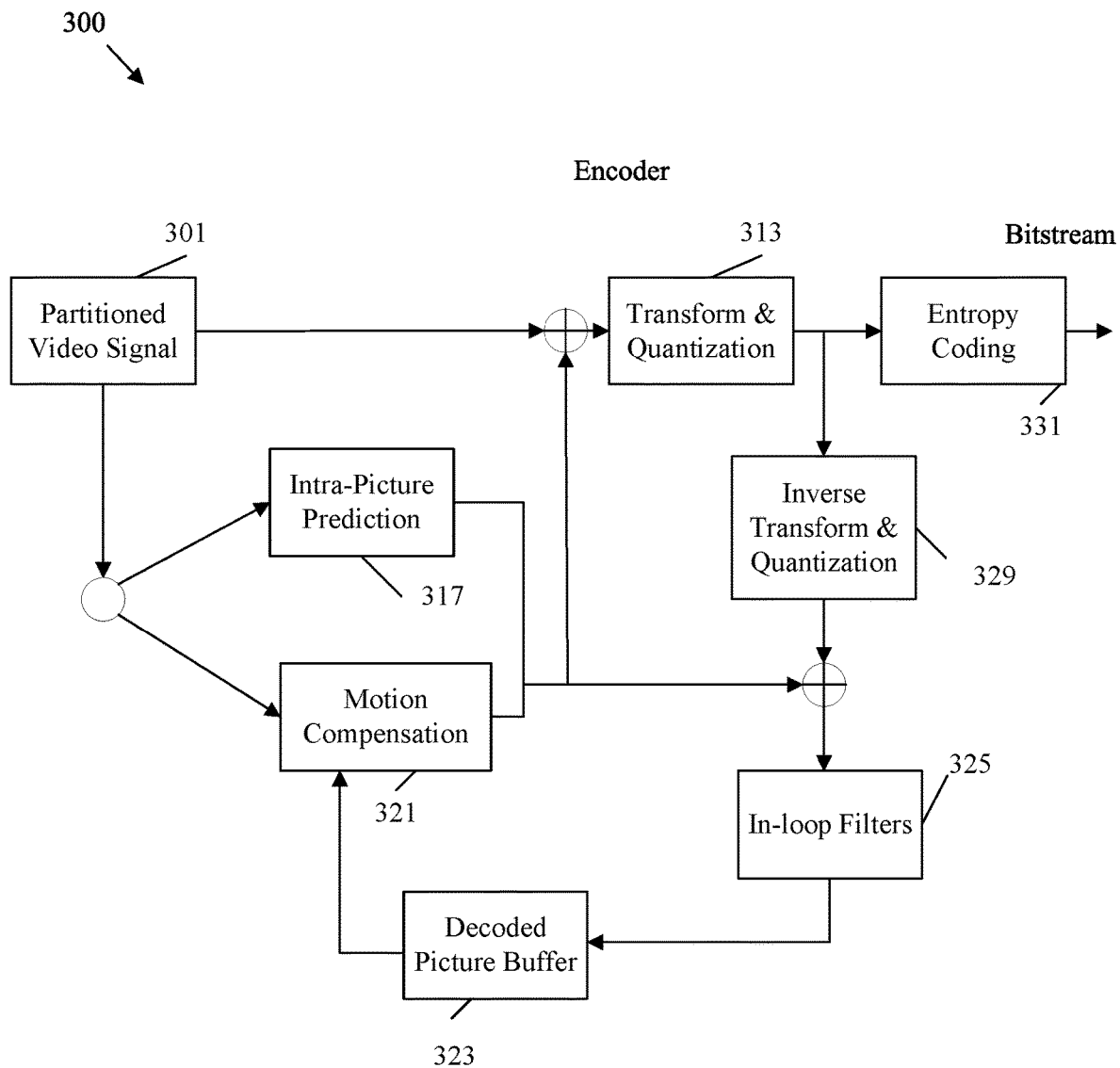
FIG. 3 is a schematic diagram illustrating an example video encoder.

FIG. 3 is a block diagram illustrating an example video encoder 300. Video encoder 300 may be employed to implement the encoding functions of codec system 200 and/or implement steps 101, 103, 105, 107, and/or 109 of operating method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer component 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters as discussed with respect to in-loop filters component 225. The filtered blocks are then stored in a decoded picture buffer component 323 for use as reference blocks by the motion compensation component 321. The decoded picture buffer component 323 may be substantially similar to the decoded picture buffer component 223.

Figure 4:
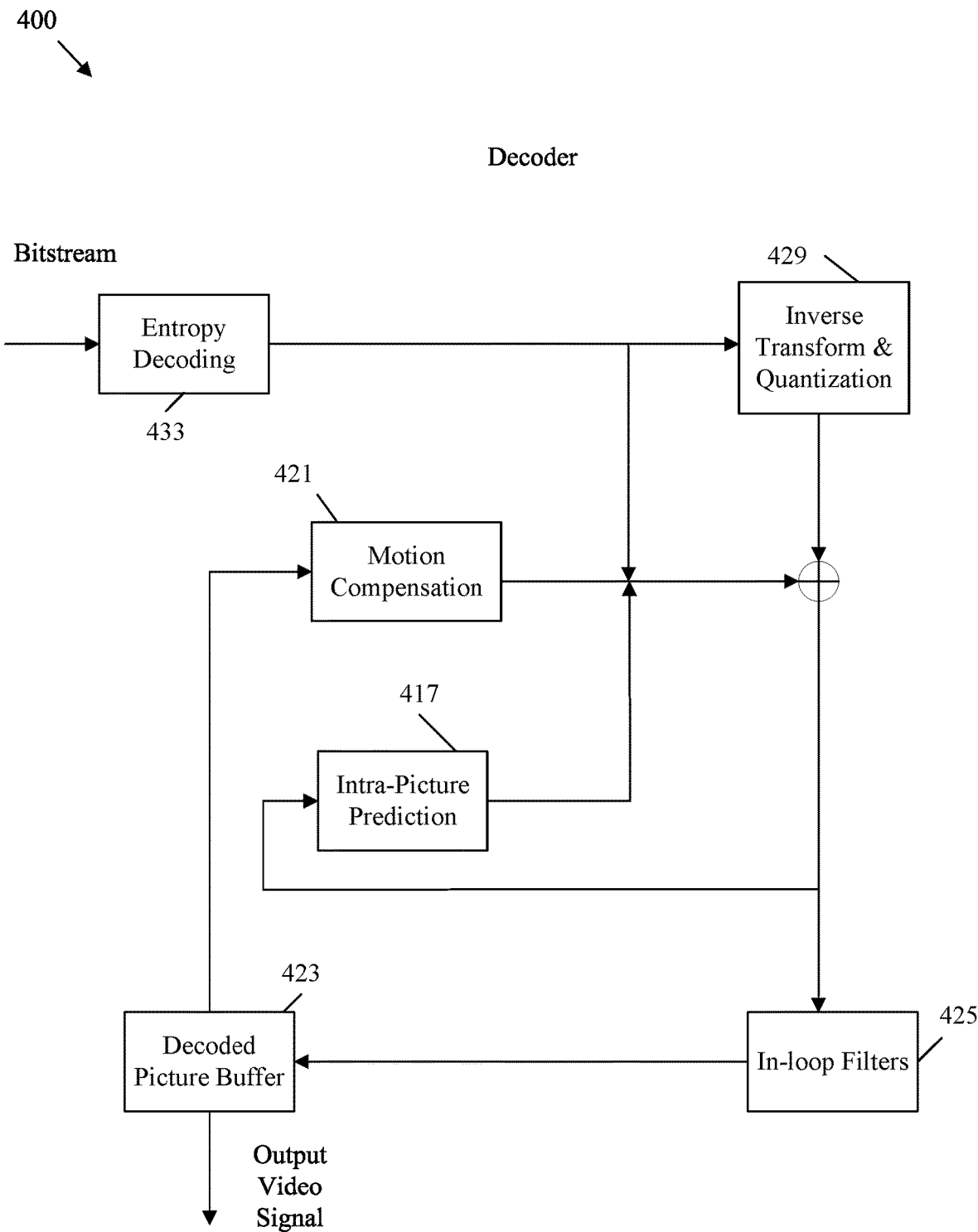
FIG. 4 is a schematic diagram illustrating an example video decoder.

FIG. 4 is a block diagram illustrating an example video decoder 400. Video decoder 400 may be employed to implement the decoding functions of codec system 200 and/or implement steps 111, 113, 115, and/or 117 of operating method 100. Decoder 400 receives a bitstream, for example from an encoder 300, and generates a reconstructed output video signal based on the bitstream for display to an end user.

The bitstream is received by an entropy decoding component 433. The entropy decoding component 433 is configured to implement an entropy decoding scheme, such as CAVLC, CABAC, SBAC, PIPE coding, or other entropy coding techniques. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be similar to inverse transform and quantization component 329.

The reconstructed residual blocks and/or prediction blocks are forwarded to intra-picture prediction component 417 for reconstruction into image blocks based on intra-prediction operations. The intra-picture prediction component 417 may be similar to intra-picture estimation component 215 and an intra-picture prediction component 217. Specifically, the intra-picture prediction component 417 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 423 via an in-loop filters component 425, which may be substantially similar to decoded picture buffer component 223 and in-loop filters component 225, respectively. The in-loop filters component 425 filters the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion estimation component 221 and/or motion compensation component 219. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

Figure 5:
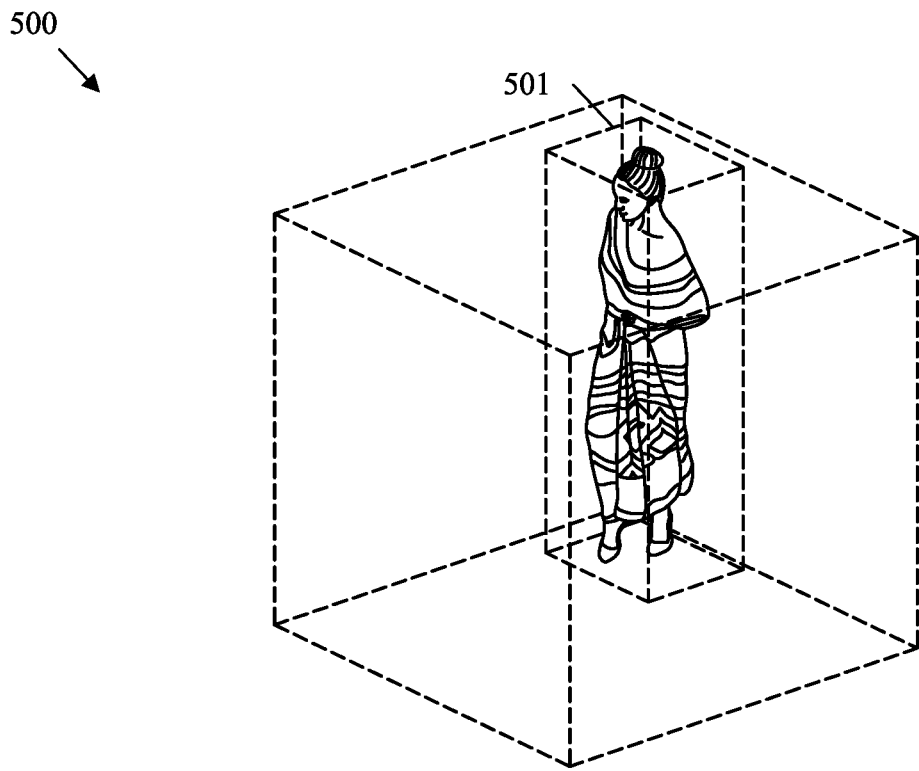
FIG. 5 is an example of point cloud media that can be coded according to Point Cloud Compression (PCC) mechanisms.

FIG. 5 is an example of point cloud media 500 that can be coded according to PCC mechanisms. Accordingly, point cloud media 500 may be coded by an encoder, such as codec system 200 and/or encoder 300, and reconstructed by a decoder, such as codec system 200 and/or decoder 400, when performing method 100.

The mechanisms described in FIGS. 1-4 generally presume a 2D frame is being coded. However, point cloud media 500 is a cloud of points that change over time. Specifically, the point cloud media 500, which can also be referred to as a point cloud and/or a point cloud representation, is group of points in 3D space. The points may also be referred to as samples. Each point may be associated with multiple types of data. For example, each point may be described in terms of position. Position is a location in 3D space that may be described as a set of Cartesian coordinates. Further, each point may contain a color. Color may be described in terms of luminance (e.g., light) and chrominance (e.g., color). Color may be described in terms of (R), green (G), and blue (B) values, or luma (Y), blue projection (U), and red projection (V), denoted as (R, G, B) or (Y, U, V), respectively. The points may also include other attributes. An attribute is an optional scalar or a vector property that may be associated with each point in a point cloud. Attributes may include reflectance, transparency, surface normal, time stamps, material identifier (ID), etc.

As each point in a point cloud media 500 may be associated with multiple types of data, several supporting mechanisms are employed to prepare the point cloud media 500 for compression according to the mechanisms described in FIGS. 1-4. For example, the point cloud media 500 can be sorted into frames, where each frame includes all the data related to a point cloud for a particular state or instant in time. As such, FIG. 5 depicts a single frame of the point cloud media 500. The point cloud media 500 is then coded on a frame by frame basis. The point cloud media 500 can be surrounded by a 3D bounding box 501. The 3D bounding box 501 is a 3D rectangular prism that is sized to surround all of the points of the point cloud media 500 for the corresponding frame. It should be noted that multiple 3D bounding boxes 501 may be employed in the event that the point cloud media 500 includes disjoint sets. For example, the point cloud media 500 could depict two figures that are not connected, in which case a 3D bounding box 501 would be placed around each figure. The points in the 3D bounding box 501 are processed as described below.

Figure 6:
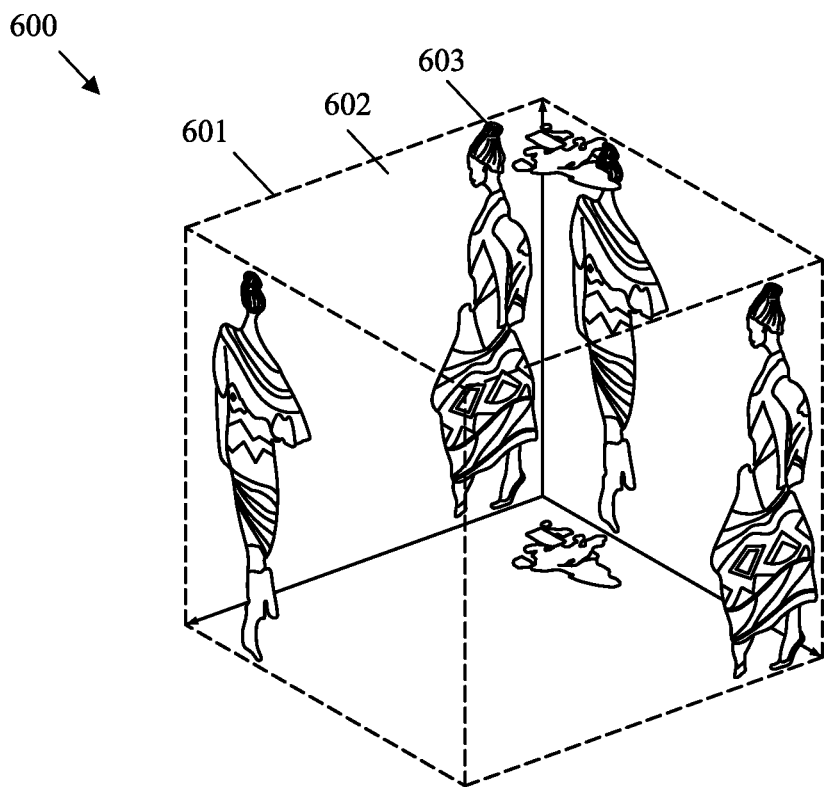
FIG. 6 is an example of patches created from a point cloud.

FIG. 6 is an example of patches 603 created from a point cloud 600. Point cloud 600 is a single frame of point cloud media 500. Further, point cloud 600 is surrounded by a 3D bounding box 601 that is substantially similar to 3D bounding box 501. Accordingly, point cloud 600 may be coded by an encoder, such as codec system 200 and/or encoder 300, and reconstructed by a decoder, such as codec system 200 and/or decoder 400, when performing method 100.

The 3D bounding box 601 includes six faces, and hence includes six 2D rectangular frames 602 that are each positioned at a face of the 3D bounding box 601 (e.g., top, bottom, left, right, front, and back). The point cloud 600 can be converted from 3D data into 2D data by projecting the point cloud 600 onto the corresponding 2D rectangular frames 602. This results in the creation of patches 603. A patch 603 is a 2D representation of a 3D point cloud, where the patch 603 contains a representation of the point cloud 600 that is visible from the corresponding 2D rectangular frame 602. It should be noted that a representation of the point cloud 600 from a 2D rectangular frame 602 may contain multiple disjoint components. As such, a 2D rectangular frame 602 may contain a plurality of patches 603. As such, a point cloud 600 may be represented by more than six patches 603. The patches 603 may also be referred to as atlas, atlas data, atlas information, and/or atlas components. By converting the 3D data into a 2D format, the point cloud 600 can be coded according to video coding mechanisms, such as inter-prediction and/or intra-prediction.

Figure 7A:
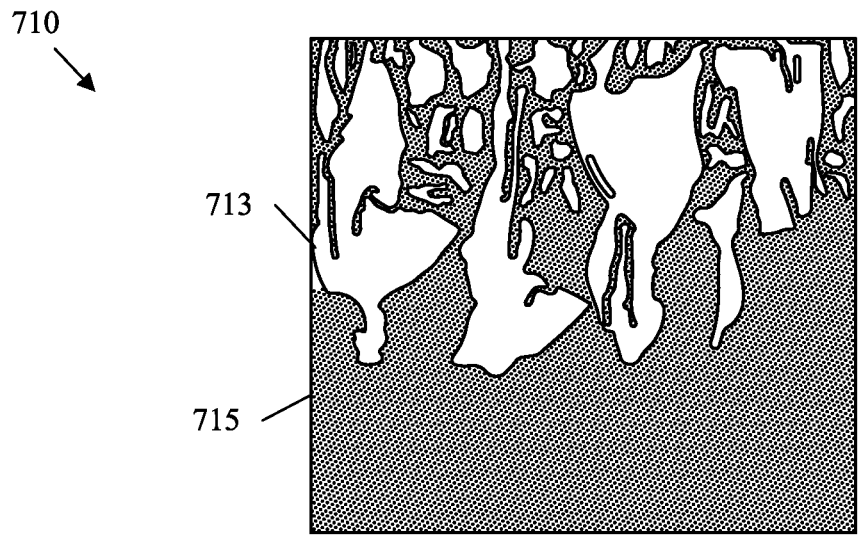
FIG. 7A illustrates an example occupancy frame associated with a set of patches.
Figure 7B:
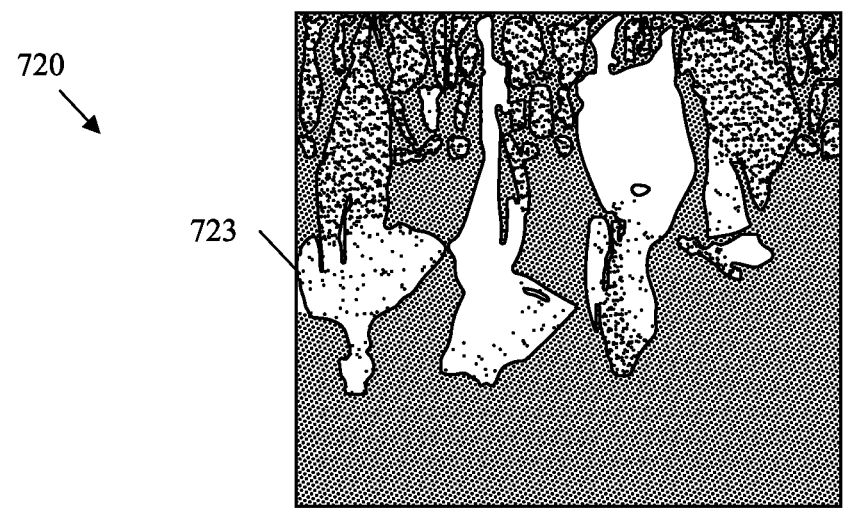
FIG. 7B illustrates an example geometry frame associated with a set of patches.
Figure 7C:
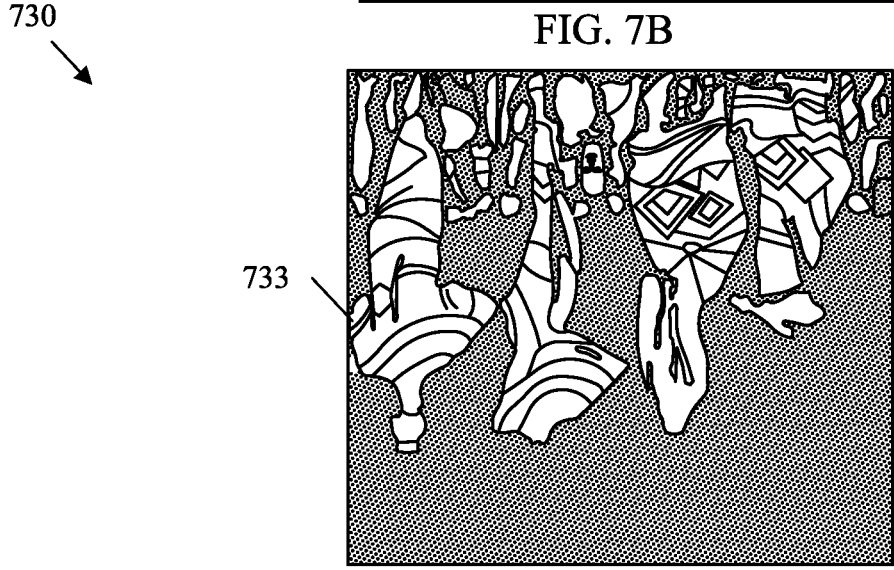
FIG. 7C illustrates an example atlas frame associated with a set of patches.

FIGS. 7A-7C illustrate mechanisms for encoding a 3D point cloud that has been converted into 2D information as described in FIG. 6. Specifically, FIG. 7A illustrates an example occupancy frame 710 associated with a set of patches, such as patches 603. The occupancy frame 710 is coded in binary form. For example, a zero represents that a portion of the bounding box 601 is not occupied by one of the patches 603. Those portions of the bounding box 600 represented by the zeros do not take part in reconstruction of a volumetric representation (e.g., the point cloud 600). In contrast, a one represents that a portion of the bounding box 600 is occupied by one of the patches 603. Those portions of the bounding box 600 represented by the ones do take part in reconstruction of the volumetric representation (e.g., the point cloud 600). Further, FIG. 7B illustrates an example geometry frame 720 associated with a set of patches, such as patches 603. The geometry frame 720 provides or depicts the contour or topography of each of the patches 603. Specifically, the geometry frame 720 indicates the distance that each point in the patches 603 is away from the planar surface (e.g., the 2D rectangular frame 602) of the bounding box 600. Also, FIG. 7C illustrates an example atlas frame 730 associated with a set of patches, such as patches 603. The atlas frame 730 provides or depicts samples of the patches 603 in the bounding box 600. The atlas frame 730 may include, for example, a color component of the points in the patches 603. The color component may be based on the RGB color model, the YUV color model, or based on another known color model. The occupancy frame 710, geometry frame 720, and atlas frame 730 can be employed to code a point cloud 600 and/or point cloud media 500. As such, the occupancy frame 710, geometry frame 720, and atlas frame 730 may be coded by an encoder, such as codec system 200 and/or encoder 300, and reconstructed by a decoder, such as codec system 200 and/or decoder 400, when performing method 100.

The various patches created by projecting 3D information onto 2D planes can be packed into a rectangular (or square) video frame. This approach may be advantageous because various video codecs, such as AVC, HEVC, and VVC are preconfigured to code such video frames. As such, the PCC codec can employ other video codecs to code the patches. As shown in FIG. 7A, the patches can be packed into a frame. The patches may be packed by any algorithm. For example, the patches can be packed into the frame based on size. In a particular example, the patches are included from largest to smallest. The largest patches may be placed first in any open space, with smaller patches filling in gaps once a size threshold has been crossed. As shown in FIG. 7A, such a packing scheme results in blank space that does not include patch data. To avoid encoding blank space, an occupancy frame 710 is employed. An occupancy frame 710 contains all occupancy data for a point cloud at a particular instant in time. Specifically, the occupancy frame 710 contains one or more occupancy maps (also known as occupancy data, occupancy information, and/or occupancy components). An occupancy map is defined as a 2D array corresponding to an atlas (group of patches) whose values indicate, for each sample position in the atlas, whether that position corresponds to a valid 3D point in the point cloud representation. As shown in FIG. 7A, the occupancy maps include areas of valid data 713. The areas of valid data 713 indicate that atlas/patch data is present in corresponding locations in the occupancy frame 710. The occupancy maps also include areas of invalid data 715. The areas of invalid data 715 indicate that atlas/patch data is not present in corresponding locations in the occupancy frame 710.

FIG. 7B depicts a geometry frame 720 of the point cloud data. The geometry frame 720 contains one or more geometry maps 723 (also known as geometry data, geometry information, and/or geometry components) for a point cloud at a particular instant in time. A geometry map 723 is a 2D array created through the aggregation of the geometry information associated with each patch, where geometry information/data is a set of Cartesian coordinates associated with a point cloud frame. Specifically, the patches are all projected from points in 3D space. Such projection has the effect of removing the 3D information from the patches. The geometry map 723 retains the 3D information removed from the patches. For example, each sample in a patch is obtained from a point in 3D space. Accordingly, the geometry map 723 may include a 3D coordinate associated with each sample in each patch. Hence, the geometry map 723 can be used by a decoder to map/convert the 2D patches back into 3D space to reconstruct the 3D point cloud. Specifically, the decoder can map each patch sample onto the appropriate 3D coordinate to reconstruct the point cloud.

FIG. 7C depicts an atlas frame 730 of the point cloud data. The atlas frame 730 contains one or more atlas 733 (also known as atlas data, atlas information, atlas components, and/or patches) for a point cloud at a particular instant in time. An atlas 733 is a collection of 2D bounding boxes projected into rectangular frames that correspond to a 3D bounding box in 3D space, where each 2D bounding box/patch represents a subset of a point cloud. Specifically, the atlas 733 contains patches created when the 3D point cloud is projected into 2D space as described with respect to FIG. 6. As such, the atlas 733/patches contain the image data (e.g., the color and light values) associated with the point cloud and a corresponding instant in time. The atlas 733 corresponds to the occupancy map of FIG. 7A and the geometry map 723 of FIG. 7B. Specifically, the atlas 733 contains data in areas of valid data 713, and does not contain data in the areas of invalid data 715. Further, the geometry map 723 contains the 3D information for the samples in the atlas 733.

It should also be noted that a point cloud can contain attributes (also known as attribute data, attribute information, and/or attribute components). Such attributes can be included in an atlas frame. An atlas frame may contain all data regarding a corresponding attribute of the point cloud at a particular instant in time. An example of an attribute frame is not shown as attributes may include a wide range of different data. Specifically, an attribute may be any scalar or vector property associated with each point in a point cloud such as reflectance, surface normal, time stamps, material IDs, etc. Further, attributes are optional (e.g., user defined), and may vary based on application. However, when used, the point cloud attributes may be included in an attribute frame in a manner similar to the atlas 733, geometry map 723, and occupancy maps.

Accordingly, an encoder can compress a point cloud frame into an atlas frame 730 of atlas 733, a geometry frame 720 of geometry maps 723, an occupancy frame 710 of occupancy maps, and optionally an attribute frame of attributes. The atlas frame 730, geometry frame 720, occupancy frame 710, and/or attribute frame can be further compressed, for example by different encoders for transmission to a decoder. The decoder can decompress the atlas frame 730, geometry frame 720, occupancy frame 710, and/or attribute frame. The decoder can then employ the atlas frame 730, geometry frame 720, occupancy frame 710, and/or attribute frame to reconstruct the point cloud frame to determine a reconstructed point cloud at a corresponding instant of time. The reconstructed point cloud frames can then be included in sequence to reconstruct the original point cloud sequence (e.g., for display and/or for use in data analysis). As a particular example, the atlas frame 730 and/or atlas 733 may be encoded and decoded by employing the techniques described with respect to FIGS. 1-4, for example by employing a VVC, HEVC, and/or AVC codec.

Figure 8:
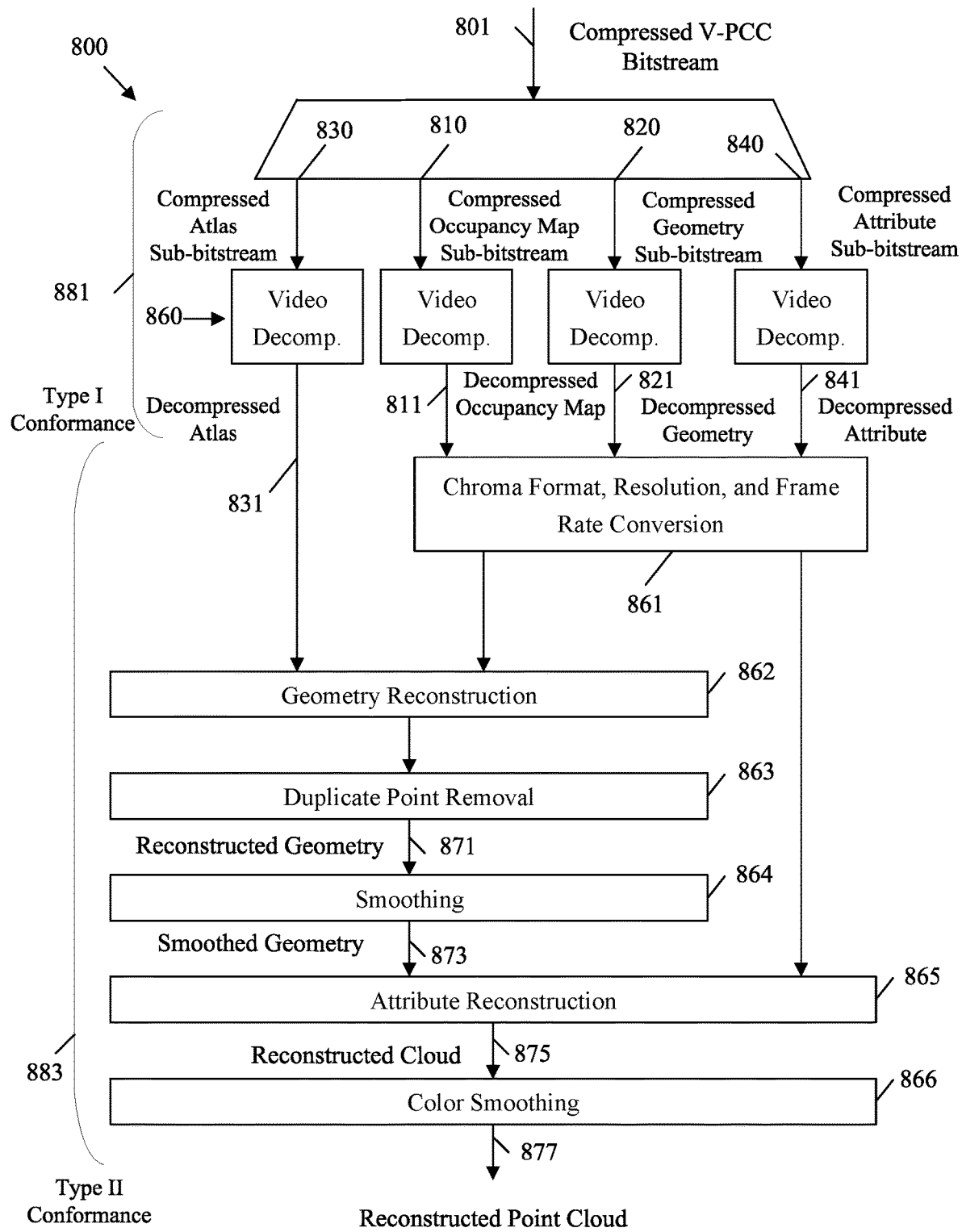
FIG. 8 is a schematic diagram of an example conformance testing mechanism.

FIG. 8 is a schematic diagram of an example conformance testing mechanism 800. The conformance testing mechanism 800 may be employed by an encoder, such as a codec system 200 and/or an encoder 300, to verify that a PCC bitstream conforms with standards, and hence can be decoded by a decoder, such as a codec system 200 and/or a decoder 400. For example, the conformance testing mechanism 800 may be employed to check whether a point cloud media 500 and/or patches 603 have been coded into an occupancy frame 710, a geometry frame 720, an atlas frame 730, and/or an attribute frame in a manner that can be correctly decoded when performing method 100.

The conformance testing mechanism 800 can test a PCC bitstream for conformance with standards. A PCC bitstream that conforms with standards should always be decodable by any decoder that also conforms to standards. A PCC bitstream that does not conform with standards may not be decodable. Hence, a PCC bitstream that fails conformance testing mechanism 800 should be re-encoded, for example by using different settings. The conformance testing mechanism 800 includes a type I conformance test 881 and a type II conformance test 883, which may also be referred to as conformance point A and B, respectively. A type I conformance test 881 checks the components of a PCC bitstream for conformance. A type II conformance test 883 checks a reconstructed point cloud for conformance. An encoder is generally required to perform a type I conformance test 881 and may optionally perform a type II conformance test 883.

Prior to performing conformance testing mechanism 800, the encoder encodes a compressed V-PCC bitstream 801 as described above. The encoder may then employ a HRD to perform the conformance testing mechanism 800 on the compressed V-PCC bitstream 801. The conformance testing mechanism 800 separates the compressed V-PCC bitstream 801 into components. Specifically, the compressed V-PCC bitstream 801 is split into a compressed atlas sub-bitstream 830, a compressed occupancy map sub-bitstream 810, a compressed geometry sub-bitstream 820, and optionally a compressed attribute sub-bitstream 840, which contain sequences of coded atlas frames 730, coded geometry frames 720, occupancy frames 710, and optionally attribute frames, respectively.

Video decompression 860 is performed on the sub-streams. Video decompression 860 is a mechanism of reversing the component specific compression. The compressed atlas sub-bitstream 830, compressed occupancy map sub-bitstream 810, compressed geometry sub-bitstream 820, and compressed attribute sub-bitstream 840 may be encoded by one or more codecs, and hence video decompression 860 includes applying a hypothetical decoder to each sub-bitstream based on the encoder employed to create the corresponding sub-bitstream. The video decompression 860 reconstructs a decompressed atlas sub-bitstream 831, decompressed occupancy map sub-bitstream 811, decompressed geometry sub-bitstream 821, and decompressed attribute sub-bitstream 841 from the compressed atlas sub-bitstream 830, compressed occupancy map sub-bitstream 810, compressed geometry sub-bitstream 820, and compressed attribute sub-bitstream 840, respectively. A decompressed sub-bitstream/component is data from a sub-bitstream that has been reconstructed as part of a decoding process or, in this case, as part of a HRD conformance test.

A type I conformance test 881 is applied to the decompressed atlas sub-bitstream 831, decompressed occupancy map sub-bitstream 811, decompressed geometry sub-bitstream 821, and decompressed attribute sub-bitstream 841. The type I conformance test 881 checks each component (the decompressed atlas sub-bitstream 831, decompressed occupancy map sub-bitstream 811, decompressed geometry sub-bitstream 821, and decompressed attribute sub-bitstream 841) to ensure the corresponding component complies with the standard used by the codec to encode and decode that component. For example, the type I conformance test 881 can verify that a standardized amount of hardware resources are capable of decompressing the corresponding component without buffer over-runs or under-runs. Further, the type I conformance test 881 can check the components for coding errors that prevent the HRD from correctly reconstructing the corresponding components. In addition, the type I conformance test 881 can check each corresponding component to ensure that all standard requirements are met and that all standard prohibitions are omitted. The type I conformance test 881 is satisfied when all components pass the corresponding tests, and is not satisfied when any one of the components fails a corresponding test. Any component that passes the type I conformance test 881 should be decodable at any decoder that also complies with the corresponding standards. As such, the type I conformance test 881 may be utilized when encoding a compressed V-PCC bitstream 801.

While a type I conformance test 881 ensures that components are decodable, the type I conformance test 881 does not guarantee that a decoder can reconstruct the original point cloud from the corresponding components. Accordingly, conformance testing mechanism 800 may also be employed to perform a type II conformance test 883. The decompressed occupancy map sub-bitstream 811, decompressed geometry sub-bitstream 821, and decompressed attribute sub-bitstream 841 are forwarded for conversion 861. Specifically, conversion 861 may convert the chroma format, resolution, and/or the frame rate of the decompressed occupancy map sub-bitstream 811, decompressed geometry sub-bitstream 821, and decompressed attribute sub-bitstream 841 as desired to match the chroma format, resolution, and/or the frame rate of the decompressed atlas sub-bitstream 831.

The results of conversion 861 as well as the decompressed atlas sub-bitstream 831 are forwarded to geometry reconstruction 862. At geometry reconstruction 862, the occupancy maps from the decompressed occupancy map sub-bitstream 811 are employed to determine the locations of valid atlas data. The geometry reconstruction 862 can then obtain geometry data from the decompressed geometry sub-bitstream 821 from any location that contains valid atlas data. The geometry data can then be employed to reconstruct a rough cloud of points, which is forwarded to duplicate point removal 863. For example, during the creation of 2D patches from a 3D cloud, some cloud points can be viewed from multiple directions. When this happens, the same point is projected as a sample into more than one patch. The geometry data is then generated based on samples, and hence includes duplicate data for such points. The duplicate point removal 863 merges such duplicate data to create a single point when geometry data indicates multiple points are located at the same location. The result is a reconstructed geometry 871 that mirrors the geometry of the originally encoded point cloud. Specifically, the reconstructed geometry 871 includes the 3D position of each point from the encoded point cloud.

The reconstructed geometry 871 is forwarded for smoothing 864. Specifically, the reconstructed geometry 871 may contain certain features that appear sharp due to noise created during the coding process. Smoothing 864 may employ one or more filters to remove such noise in order to create a smoothed geometry 873 that is an accurate representation of the originally encoded point cloud. The smoothed geometry 873 is then forwarded to attribute reconstruction 865 along with atlas data from the decompressed atlas sub-bitstream 831 and attribute data from conversion 861. Attribute reconstruction 865 colors the points located at the smoothed geometry 873 with the colors from the atlas/patch data. Attribute reconstruction 865 also applies any attributes to the points. This results in a reconstructed cloud 875 that mirrors the originally encoded point cloud. The reconstructed cloud 875 may contain color or other attribute noise caused by the coding process. Accordingly, the reconstructed cloud 875 is forwarded for color smoothing 866, which applies one or more filters to the luma, chroma, or other attribute values to smooth such noise. Color smoothing 866 can then output a reconstructed point cloud 877. The reconstructed point cloud 877 should be an exact representation of the originally encoded point cloud if lossless coding is employed. Otherwise, the reconstructed point cloud 877 closely approximates the originally encoded point cloud with variances that do not exceed a predefined tolerance.

The type II conformance test 883 is applied to the reconstructed point cloud 877. The Type II conformance test 883 checks the reconstructed point cloud 877 to ensure the reconstructed point cloud 877 complies with the V-PCC standard, and hence can be decoded by a decoder that complies with the V-PCC standard. For example, the type II conformance test 883 can verify that a standardized amount of hardware resources are capable of reconstructing the reconstructed point cloud 877 without buffer over-runs or under-runs. Further, the type II conformance test 883 can check the reconstructed point cloud 877 for coding errors that prevent the HRD from correctly reconstructing the reconstructed point cloud 877. In addition, the type II conformance test 883 can check each decompressed component and/or any intermediate data to ensure that all standard requirements are met and that all standard prohibitions are omitted. The type II conformance test 883 is satisfied when the reconstructed point cloud 877 and any intermediate components pass the corresponding tests, and is not satisfied when the reconstructed point cloud 877 or any of the intermediate components fails a corresponding test. When the reconstructed point cloud 877 passes the type II conformance test 883, the reconstructed point cloud 877 should be decodable at any decoder that also complies with the V-PCC standard. As such, the type II conformance test 883 may provide a more robust verification of the compressed V-PCC bitstream 801 than the type I conformance test 881.

Figure 9:
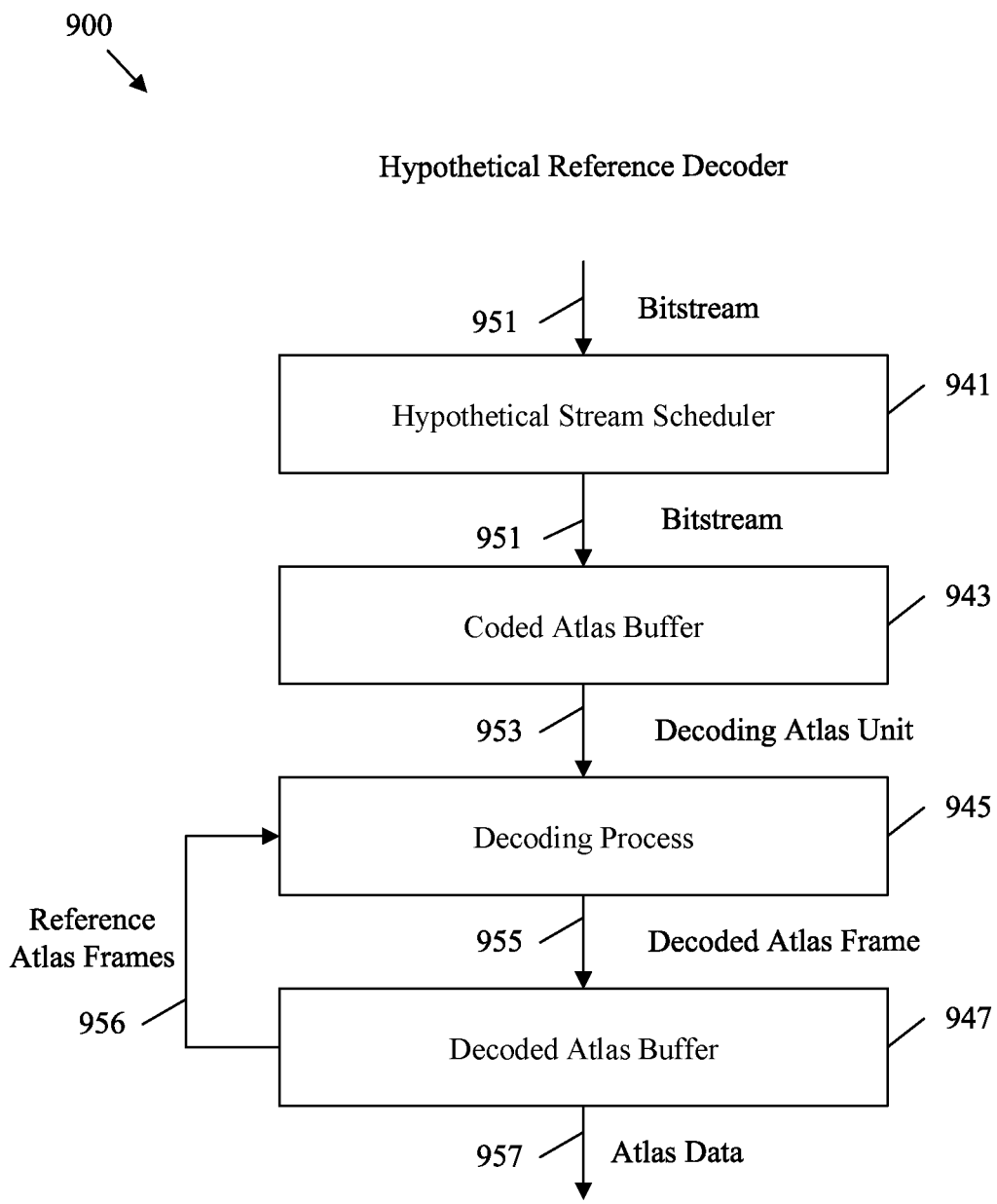
FIG. 9 is a schematic diagram of an example hypothetical reference decoder (HRD) configured to perform a conformance test on a PCC bitstream.

FIG. 9 is a schematic diagram of an example HRD 900 configured to perform a conformance test, for example by employing conformance testing mechanism 800, on a PCC bitstream, which may include a point cloud media 500 and/or patches 603 coded into an occupancy frame 710, a geometry frame 720, an atlas frame 730, and/or an attribute frame. As such, the HRD 900 may be employed by a codec system 200 and/or an encoder 300 that is encoding a bitstream as part of method 100 for decoding by a codec system 200 and/or decoder 400. Specifically, the HRD 900 may check a PCC bitstream and/or components thereof before the PCC bitstream is forwarded to a decoder. In some examples, the PCC bitstream may be continuously forwarded through the HRD 900 as the PCC bitstream is encoded. In the event that a portion of the PCC bitstream fails to conform to associated constraints, the HRD 900 can indicate such failure to an encoder, which may cause the encoder to re-encode the corresponding section of the bitstream with different mechanisms. In some examples, the HRD 900 may be configured to perform checks on an atlas sub-bitstream and/or on a reconstructed point cloud. In some examples, the occupancy map components, geometry components, and attribute components may be encoded by other codecs. Hence, the sub-bitstreams containing the occupancy map components, geometry components, and attribute components may be checked by other HRDs. As such, a plurality of HRDs that include HRD 900 may be employed to completely check a PCC bitstream for conformance in some examples.

The HRD 900 includes a hypothetical stream scheduler (HSS) 941. A HSS 941 is a component configured to perform a hypothetical delivery mechanism. The hypothetical delivery mechanism is used for checking the conformance of a bitstream, a sub-bitstream, and/or a decoder with regards to the timing and data flow of a PCC bitstream 951 input into the HRD 900. For example, the HSS 941 may receive a PCC bitstream 951 or a sub-bitstream thereof output from an encoder. The HSS 941 may then manage the conformance testing process on the PCC bitstream 951, for example by employing conformance testing mechanism 800. In a particular example, the HSS 941 can control the rate that coded atlas data moves through the HRD 900 and verify that the PCC bitstream 951 does not contain non-conforming data. The HSS 941 may forward the PCC bitstream 951 to a CAB 943 at a predefined rate. For purposes of the HRD 900, any units containing coded video in the bitstream 951, such as an AU and/or a NAL unit, may be referred to as decoding atlas units 953. Decoding atlas units 953 may contain only atlas data in some examples. In other examples, the decoding atlas units 953 may contain other PCC components and/or a set of data to reconstruct the point cloud. Accordingly, the decoding atlas units 953 may generally be referred to as decoding units in same examples. The CAB 943 is a first-in first-out buffer in the HRD 900. The CAB 943 contains decoding atlas units 953 including atlas data, geometry data, occupancy data, and/or attribute data, in decoding order. The CAB 943 stores such data for use during PCC bitstream conformance testing/checking.

The CAB 943 forwards the decoding atlas units 953 to a decoding process component 945. The decoding process component 945 is a component that conforms to a PCC standard or other standard employed to code a PCC bitstream and/or sub-bitstream thereof. For example, the decoding process component 945 may emulate a decoder employed by an end user. For example, the decoding process component 945 may perform a type I conformance test by decoding atlas components and/or a type II conformance test by reconstructing point cloud data. The decoding process component 945 decodes the decoding atlas units 953 at a rate that can be achieved by an example standardized decoder. If the decoding process component 945 cannot decode the decoding atlas units 953 fast enough to prevent an overflow of the CAB 943, then the PCC bitstream 951 does not conform to the standard and should be re-encoded. Likewise, if the decoding process component 945 decodes the decoding atlas units 953 too quickly and the CAB 943 runs out of data (e.g., a buffer underrun), then the PCC bitstream 951 does not conform to the standard and should be re-encoded.

The decoding process component 945 decodes the decoding atlas units 953, which creates decoded atlas frames 955. Decoded atlas frames 955 may contain a complete set of atlas data for a PCC frame in the event of a type I conformance test or a frame of a reconstructed point cloud in a type II conformance test context. The decoded atlas frames 955 are forwarded to a DAB 947. The DAB 947 is a first-in first-out buffer in a HRD 900 that contains decoded/decompressed atlas frames and/or reconstructed point cloud frames (depending on context) in decoding order for use during PCC bitstream conformance testing. The DAB 947 may be substantially similar to a decoded picture buffer component 223, 323, and/or 423. To support inter-prediction, frames that are marked for use as reference atlas frames 956 that are obtained from the decoded atlas frames 955 are returned to the decoding process component 945 to support further decoding. The DAB 947 outputs the atlas data 957 (or reconstructed point clouds, depending on context) on a frame by frame basis. As such, the HRD 900 can determine whether coding is satisfactory and whether constraints are met by the PCC bitstream 951 and/or components thereof.

Figure 10:
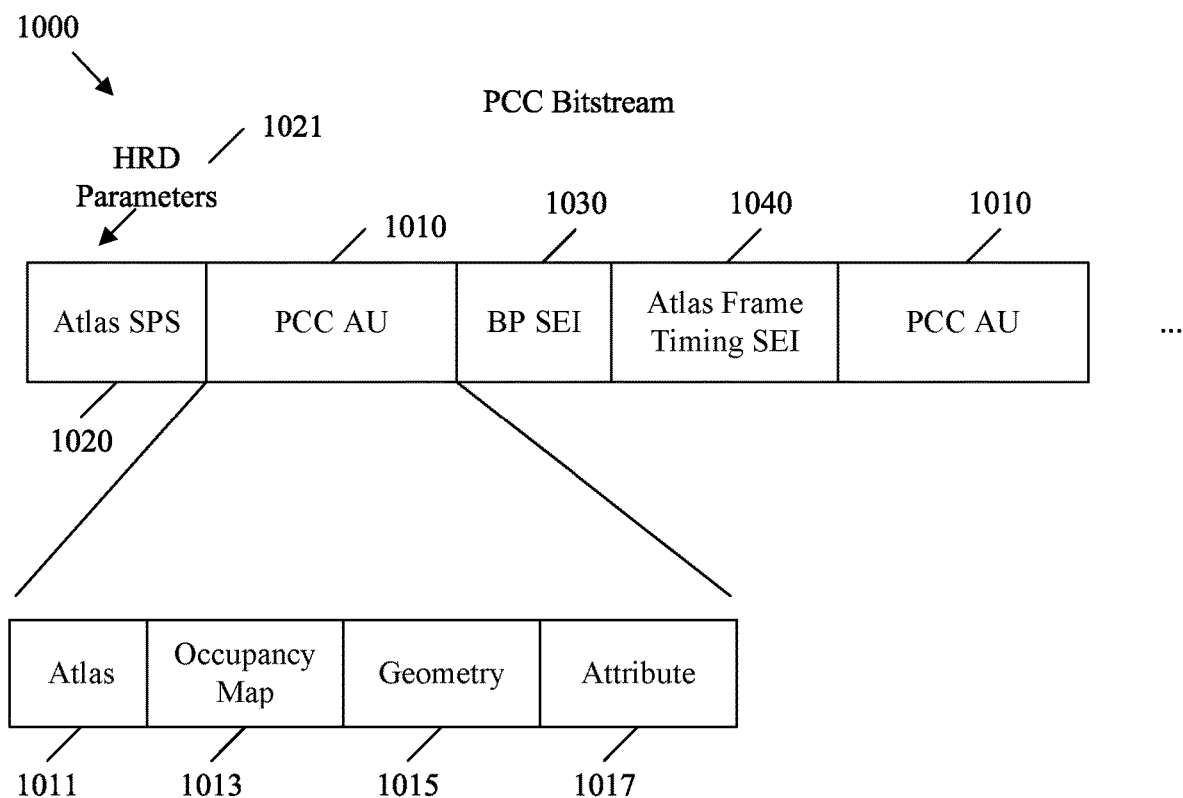
FIG. 10 is a schematic diagram illustrating an example PCC bitstream for use in initializing a HRD to support HRD conformance tests.

FIG. 10 is a schematic diagram illustrating an example PCC bitstream 1000 for use in initializing a HRD, such as HRD 900, to support HRD conformance tests, such as conformance testing mechanism 800. For example, the bitstream 1000 can be generated by a codec system 200 and/or an encoder 300 for decoding by a codec system 200 and/or a decoder 400 according to method 100. Further, the bitstream 1000 may include a point cloud media 500 and/or patches 603 coded into an occupancy frame 710, a geometry frame 720, an atlas frame 730, and/or an attribute frame.

The PCC bitstream 1000 includes a sequence of PCC AUs 1010. A PCC AU 1010 includes sufficient components to reconstruct a single PCC frame captured at a particular time instance. For example, a PCC AU 1010 may contain an atlas frame 1011, an occupancy map frame 1013, and a geometry map frame 1015, which may be substantially similar to an atlas frame 730, an occupancy frame 710, and a geometry frame 720, respectively. The PCC AU 1010 may also contain an attribute frame 1017, which includes all of the attributes related to the point cloud at the time instance as coded in the PCC AU 1010. Such attributes may include a scalar or vector property optionally associated with each point in a point cloud such as color, reflectance, surface normal, time stamps, material ID, etc. A PCC AU 1010 may be defined as a set of NAL units that are associated with each other according to a specified classification rule and pertain to one particular output time. As such, data is positioned in the PCC AUs 1010 in NAL units. A NAL unit is a packet sized data container. For example, a single NAL unit is generally sized to allow for network transmission. A NAL unit may contain a header indicating the NAL unit type and a payload that contains the associated data.

The PCC bitstream 1000 also includes various data structures to support decoding the PCC AUs 1010, for example as part of a decoding process and/or as part of a HRD process. For example, the PCC bitstream 1000 may include various parameter sets that contain parameters used to code the one or more PCC AUs 1010. As a specific example, the PCC bitstream 1000 may contain an atlas sequence parameter set (SPS) 1020. An atlas SPS 1020 is a syntax structure containing syntax elements that apply to zero or more entire coded atlas sequences as determined by the content of a syntax element found in the atlas SPS 1020 referred to by a syntax element found in each tile group header. For example, the atlas SPS 1020 may contain parameters that are related to an entire sequence of atlas frames 1011.

The PCC bitstream 1000 also includes various SEI messages. An SEI message is a syntax structure with specified semantics that conveys information that is not needed by decoding processes in order to determine the values of samples in decoded pictures. Accordingly, SEI messages may be employed to convey data that is not directly related to decoding PCC AUs 1010. In the example shown, the PCC bitstream 1000 includes a buffering period SEI message 1030 and an atlas frame timing SEI message 1040.

As noted above, some PCC related video coding systems may not be configured to employ a HRD 900 and/or a conformance testing mechanism 800. In the example shown, the atlas SPS 1020, buffering period SEI message 1030, and the atlas frame timing SEI message 1040 are employed to initialize and manage the function of a HRD when performing conformance testing on a PCC bitstream 1000. For example, HRD parameters 1021 may be included in the atlas SPS 1020. The HRD parameters 1021 are syntax elements that initialize and/or define operational conditions of a HRD. For example, the HRD parameters 1021 may be employed to specify a conformance point, such as a type I conformance test 881 or a type II conformance test 883, for a HRD conformance check at the HRD. As such the HRD parameters 1021 may be employed to indicate whether an HRD conformance check should be performed on decompressed PCC components or reconstructed point clouds. For example, the HRD parameters 1021 may be set to a first value to indicate that a HRD conformance check should be performed on decompressed attribute components, decompressed atlas components, decompressed occupancy map components, and decompressed geometry components (e.g., the attribute frame 1017, the atlas frame 1011, the occupancy map frame 1013, and the geometry map frame 1015, respectively.) Further, the HRD parameters 1021 may be set to a first value to indicate that a HRD conformance check should be performed on reconstructed point clouds from the PCC components (e.g., reconstructed from the entire PCC AU 1010).

The buffering period SEI message 1030 is an SEI message that contains data indicating initial removal delays related to a CAB (e.g., CAB 943) in a HRD. An initial CAB removal delay is an amount of time a component in a first AU in a bitstream, such as a PCC AU 1010, or a first AU in a sub-bitstream, such as an atlas frame 1011, can remain in the CAB prior to removal. For example, the HRD can begin removing any decoding units related to the first PCC AU 1010 from the CAB in the HRD during the HRD conformance check based on an initial delay specified by the buffering period SEI message 1030. As such, the buffering period SEI message 1030 contains data sufficient to initialize a HRD conformance testing process to begin at a coded PCC AU 1010 associated with the buffering period SEI message 1030. Specifically, the buffering period SEI message 1030 may indicate to the HRD that conformance testing should begin at the first PCC AU 1010 in the PCC bitstream 1000.

The atlas frame timing SEI message 1040 is an SEI message that contains data indicating a removal delay relating to a CAB (e.g., CAB 943) and an output delay related to a DAB (e.g., DAB 947) in a HRD. A CAB removal delay is an amount of time a component (e.g., any corresponding component) can remain in the CAB prior to removal. The CAB removal delay may be coded in reference to the initial CAB removal delay indicated by the buffering period SEI message 1030. A DAB output delay is an amount of time a decompressed/decoded component (e.g., any corresponding component) can remain in the DAB prior to being output (e.g., as part of a reconstructed point cloud). As such, a HRD may remove decoding units from the CAB in the HRD during conformance checks as specified by the atlas frame timing SEI message 1040. Further, a HRD can set an output delay of a DAB in the HRD as specified by the atlas frame timing SEI message 1040.

Accordingly, the encoder can encode the HRD parameters 1021, buffering period SEI message 1030, and the atlas frame timing SEI message 1040 into the PCC bitstream 1000 during the encoding process. The HRD can then read the HRD parameters 1021, buffering period SEI message 1030, and the atlas frame timing SEI message 1040 to obtain sufficient information to perform a conformance check, such as conformance testing mechanism 800, on the PCC bitstream 1000. Further, a decoder obtain the HRD parameters 1021, buffering period SEI message 1030, and/or the atlas frame timing SEI message 1040 from the PCC bitstream 1000 and infer by the presence of such data that a HRD check has been performed on the PCC bitstream 1000. Hence, the decoder can infer that the PCC bitstream 1000 is decodable, and hence can decode the PCC bitstream 1000 based on the HRD parameters 1021, buffering period SEI message 1030, and/or the atlas frame timing SEI message 1040.

The PCC bitstream 1000 may be of varying sizes and may be transmitted from an encoder to a decoder via a transmission network at various rates. For example, an volumetric sequence that is approximately one hour in length can be encoded into a PCC bitstream 1000 with a file size of between fifteen and seventy gigabytes when an HEVC based encoder is employed. A VVC based encoder may further reduce the file size by about thirty to thirty five percent versus the HEVC encoder. Accordingly, a volumetric sequence of an hour in length that is encoded with a VVC encoder may result in a file with a size of about ten to forty nine gigabytes. A PCC bitstream 800 may be transmitted at different rates depending on the status of the transmission network. For example, a PCC bitstream 1000 may be transmitted across a network at a bit rate of between five to twenty megabytes per second. Similarly, encoding and decoding processes described herein can be performed, for example, at rates faster than one megabyte per second.

The preceding information is now described in more detail herein below. A point cloud is a set of data points in the three dimensional (3D) space. Each data point includes parameters that determine a position, a color (R, G, B) or (Y, U, V), and optionally other properties like transparency, reflectance, time of acquisition, etc. The position may be described as a point relative to an X axis, a Y axis, and a Z axis. Each point in a cloud may be described by the same number of attributes. Point clouds may be used in various applications such as real-time 3D immersive telepresence, content virtual reality (VR) viewing with interactive parallax, 3D free viewpoint sport replays broadcasting, geographic information systems, cultural heritage, autonomous navigation based on large-scale 3D dynamic maps, and automotive applications. The ISO/IEC Moving Picture Experts Group (MPEG) manages a codec standard related to point cloud coding for lossless and lossy compressed point cloud data with substantial coding efficiency and robustness to network environments. The use of this codec standard allows point clouds to be manipulated as a form of computer data, to be stored on various storage media, transmitted and received over networks, and distributed on broadcasting channels. PCC work may be classified into PCC category 1, PCC category 2, and PCC category 3. A version of PCC category 2, which is also referred as V-PCC, is included in MPEG output document N18479. V-PCC is designed to leverage other video codecs, such as AVC, HEVC, VVC, etc., to compress occupancy information, geometry information, and texture information (as well as other types of attributes) of a dynamic point cloud. This results in compressing the point cloud data as a set of different video sequences. Additional metadata for interpreting the video substreams, such as atlas/patch information, may also be generated and compressed separately.

Some V-PCC designs may have certain problems. A first example problem is that example V-PCC systems may not employ signaling indicating whether a V-PCC coded frame is an IRAP frame or not. For example, a V-PCC system may determine whether a patch/atlas frame is an TRAP frame by checking a number of active entries in each reference patch frame list. If the reference patch frame list includes zero active entries for a V-PCC frame, then that frame is an TRAP frame. This determination may be made as part of a patch frame order count (PFOC) derivation process. Such a process lacks a direct indication of whether a V-PCC frame is an TRAP frame. The lack of an IRAP indication may create difficulties for systems operations. Further, the lack of an TRAP indication may also create problems for the decoding process. In an example implementation, the PFOC derivation process may be invoked first. Then a reference patch frame list (RPFL) construction process is performed followed by a reference patch frame marking process. However, any patch frame after the first patch frame is decoded after a previous patch frame in decoding order. Accordingly, any patch frame after the first patch frame may be associated with a decoded picture frame buffer (DPFB) that includes at least one decoded patch frame. The PFOC derivation process triggers a PFOC most significant bit (MSB) reset when there is no available reference patch frame in the reference patch frame buffer. In such a case, the PFOC derivation process for triggering PFOC MSB resetting may never be satisfied except for the very first patch frame. Therefore, for all patch frames after the very first patch frame, the PFOC most significant bit (MSB) may not be properly reset, which may prevent proper IRAP determination. Consequently random accessibility from any position except the very first patch frame may not operate correctly in some V-PCC systems.

A second example problem is that some V-PCC systems may include a buffering model, such as a HRD. Such systems cannot check V-PCC bitstream and V-PCC decoder conformances. The lack of conformance checking may prevent V-PCC systems from operating correctly in conjunction with applications, contents, and devices manufactured by different entities.

A third example problem is that some V-PCC systems may not apply a decoding order restriction on coded frames within a V-PCC AU. Further, such V-PCC systems may not employ an explicit signaling mechanism of the start of an AU. As such, V-PCC AU boundary detection may be difficult in some V-PCC systems.

In general, the present disclosure describes techniques related to V-PCC. More specifically, the present disclosure describes techniques for improved designs of high-level syntax for V-PCC. Specifically, the present disclosure provides solutions to one or more of the abovementioned problems.

In order to solve the first problem, an indication may be explicitly signaled to indicate whether a V-PCC coded frame is an TRAP frame. For example, a bit in the V-PCC unit header may be used for such an indication. In an example, such an indication can be referred to as a vpcc_irap_flag. The following changes can be made to support such an update. The definition of coded point cloud sequence (CPCS) may be changed as described below. Further, a definition of an IRAP V-PCC AU may be added. Also, a constraint may be added such that ptgh_type is set equal to one for IRAP patch frames. The PFOC derivation process may be altered to check whether the current patch frame is an IRAP frame instead of checking whether there is an available reference patch frame in the reference patch frame buffer. In addition, the reference patch frame marking process may be changed to mark all/any reference patch frames currently in the DPFB as unused for reference when the current patch frame is an IRAP frame. In an example implementation three bits in the V-PCC unit header can be used to indicate a frame is an IRAP frame (e.g., instead of the flag). This approach would allow for a clear specification of six V-PCC IRAP types, which may be mapped to the six different types of IRAP pictures in HEVC. Further, the patch tile group header syntax may be altered such that the RPFL syntax elements are not present when vpcc_irap_flag is equal to one.

In another implementation, RPFL syntax elements may be required to contain zero active entries for each RPFL associated with an IRAP frame. Further, the list construction process and the marking process may be invoked before the invocation of the PFOC derivation process. In such a case, the PFOC is derived for an IRAP frame only when the condition that there is no available reference patch frame in the reference patch frame buffer is true in the PFOC derivation process. For non-IRAP frames, the PFOC derivation process, the list construction process, and the marking process may be executed in that order because the PFOC value of the current frame is employed to derive a non-empty reference patch frame list.

In order to solve the second problem, a HRD is included to check two conformance points denoted as conformance point A and conformance point B (also known as type I conformance and type II conformance). For conformance point A, the HRD checks the output of each sub-bitstream decoder. V-PCC may employ a HRD corresponding to the indicated video codec for each of the video sub-bitstreams. V-PCC may also employ a V-PCC specific HRD for the patch/atlas sub-bitstream. In such a case, the encoder may signal a set of sequence-level HRD parameters in the bitstream/sub-bitstreams. Further, the encoder can signal buffering period parameters and frame timing parameters using SEI messages. The HRD can then perform HRD operations on the sub-bitstream(s) based on the signaled parameters. For conformance point B, the HRD can check the output of the reconstructed point cloud frames. In such a case, the encoder may signal a set of sequence-level HRD parameters in the bitstream/sub-bitstreams. Further, the encoder can signal buffering period parameters and AU timing parameters using SEI messages. The HRD can then perform HRD operations on the entire V-PCC bitstream based on the signaled parameters. Such a check can be performed on an AU by AU basis where the output is a list of reconstructed point cloud frames.

In order to solve the third problem, a minimum decoding order restriction may be employed in some example implementations. Such a restriction may require that the patch/atlas frames are coded as the first frame within each AU in order to enable AU detection. In another example implementation, an occupancy frame or a geometry frame may always be coded as the first frame within each AU in order to enable AU detection. In another example implementation, the start of an AU can be determined by using a flag in the V-PCC unit header or by employing a V-PCC AU delimiter for the V-PCC unit.

The following is an example implementation of one or more of the aspects described herein. The following are example definitions. A coded frame is a coded representation of a V-PCC frame of patch, occupancy, geometry, or a particular type of attribute. A coded point cloud sequence (CPCS) is a sequence of V-PCC AUs that includes, in decoding order, an TRAP V-PCC AU followed by zero or more V-PCC AUs that are not TRAP V-PCC AUs. The CPCS includes all subsequent V-PCC AUs up to, but not including, any subsequent IRAP V-PCC AU. An IRAP V-PCC AU is a V-PCC AU containing V-PCC units with vpcc_irap_flag set equal to one. A V-PCC access unit is a set of V-PCC units that are associated with each other according to a specified classification rule, are consecutive in decoding order, and contain all V-PCC units pertaining to one particular output time. A V-PCC bitstream is a sequence of bits that forms the representation of coded point cloud frames and associated data forming one or more CPCSs. A V-PCC unit is a syntax structure containing an indication of the type of data to follow and bytes containing that data.

An example V-PCC unit header syntax is as follows.

|  | Descriptor |
| --- | --- |
| vpcc_unit_header( ) { |  |
|   vpcc_unit_type | u(5) |
|   if( vpcc_unit_type == VPCC_AVD \|\| |  |
|     vpcc_unit_type == VPCC_GVD \|\| |  |
|     vpcc_unit_type == VPCC_OVD \|\| |  |
|     vpcc_unit_type == VPCC_PDG ) { |  |
|     vpcc_irap_flag | u(1) |
|     vpcc_sequence_parameter_set_id | u(4) |
|   } |  |
|   if( vpcc_unit_type == VPCC_AVD ) { |  |
|     vpcc_attribute_index | u(7) |
|     vpcc_attribute_dimension_index | u(7) |
|     if( sps_multiple_layer_streams_present_flag ) { |  |
|       vpcc_layer_index | u(4) |
|       pcm_separate_video_data( 3 ) |  |
|     } else |  |
|       pcm_separate_video_data( 7 ) |  |
|   } else if( vpcc_unit_type == VPCC_GVD ) { |  |
|     if( sps_multiple_layer_streams_present_flag ) { |  |
|       vpcc_layer_index | u(4) |
|       pcm_separate_video_data( 17 ) |  |
|     } else |  |
|       pcm_separate_video_data( 21 ) |  |
|   } |  |
|   else if( vpcc_unit_type == VPCC_OVD \|\| |  |
|     vpcc_unit_type == VPCC_PDG ) |  |
|     vpcc_reserved_zero_22bits | u(23) |
|   } else |  |
|     vpcc_reserved_zero_27bits | u(27) |
| } |  |

An example V-PCC unit header semantics are as follows. A vpcc_unit_type indicates the V-PCC unit type. A vpcc_irap_flag may be set equal to zero to specify that the coded frame containing the V-PCC unit is not an IRAP frame. The vpcc_irap_flag may be set equal to one to specify that the coded frame containing the V-PCC unit is an IRAP frame. When vpcc_unit_type is equal to V-PCC Occupancy Video Data (VPCC_OVD), V-PCC Geometry Video Data (VPCC_GVD), or V-PCC Attribute Video Data (VPCC_AVD), the following applies. When the identified video codec is AVC, let avcVclNalUnitType be the AVC network abstraction layer (NAL) unit type of the VCL NAL units in the AVC access unit that contains the V-PCC unit payload, in which case the following applies. If avcVclNalUnitType is equal to five, the vpcc_irap_flag shall be equal to one. Otherwise, the vpcc_irap_flag shall be equal to zero.

When the identified video codec is HEVC, let hevcVclNalUnitType be the HEVC NAL unit type of the VCL NAL units in the HEVC access unit that contains the V-PCC unit payload, in which case the following applies. The value of hevcVclNalUnitType shall not be equal to Clean Random Access (CRA) NAL unit type (CRA_NUT), Broken Link Access (BLA) with leading pictures (BLA_W_LP), BLA with random access decodable leading (RADL) pictures (BLA_W_RADL), or BLA with no leading pictures (BLA_N_LP). Even when HEVC CRA pictures are not allowed to be used, open-group of pictures (GOP) random access points can still be coded and signaled using the HEVC recovery point SEI message. If hevcVclNalUnitType is equal to Instantaneous Decoding Refresh (IDR) with RADL pictures (IDR_W_RADL) or IDR with no leading pictures (IDR_N_LP), the vpcc_irap_flag shall be equal to one. Otherwise, the vpcc_irap_flag shall be equal to zero.

When the identified video codec is VVC, let vvcVclNalUnitType be the VVC NAL unit type of the VCL NAL units in the VVC access unit that contains the V-PCC unit payload, in which case the following applies. The value of vvcVclNalUnitType shall not be equal to CRA_NUT. Even when VVC CRA pictures are not allowed to be used, open-GOP random access points can still be coded and signaled using the VVC recovery point SEI message. If vvcVclNalUnitType is equal to IDR_W_RADL or IDR_N_LP, vpcc_irap_flag shall be equal to one. Otherwise, vpcc_irap_flag shall be equal to zero. Similar constraints can be specified for other video codecs that may be used for coding of a V-PCC attribute sub-stream.

The vpcc_sequence_parameter_set_id may specify the value of sps_sequence_parameter_set_id for the active V-PCC SPS. The value of vpcc_sequence_parameter_set_id should be in the range of zero to fifteen, inclusive.

An example patch tile group header semantics are as follows. The ptgh_type specifies the coding type of the current patch tile group as follows.

| ptgh_type | Name of ptgh_type |
| --- | --- |
| 0 | P (P patch tile group) |
| 1 | I (I patch tile group) |

Name association to ptgh_type

When vpcc_irap_flag is equal to one, the value of ptgh_type shall be equal to one.

An example patch frame order count derivation process is as follows. When the current patch frame is an IRAP frame, the variables prevPatchFrmOrderCntLsb and prevPatchFrmOrderCntMsb are derived as follows. Let prevPatchFrm be the previous patch frame in decoding order. The variable prevPatchFrmOrderCntLsb is set equal to the patch frame order count least significant bit (LSB) value of prevPatchFrm. The variable prevPatchFrmOrderCntMsb is set equal to PatchFrmOrderCntMsb of prevPatchFrm. The variable PatchFrmOrderCntMsb of the current patch tile group is derived as follows. If the current patch frame is an IRAP frame, PatchFrmOrderCntMsb is set equal to zero.

An example reference patch frame list construction process is invoked at the beginning of the decoding process for each non-IRAP patch frame. An example reference patch frame marking process is invoked at the beginning of the decoding process for each non-IRAP patch frame. Short term reference patch frames are identified by their PatchFrmOrderCntVal values. Long term reference patch frames are identified by the Log2(MaxLtPatchFrmOrderCntLsb) least significant bits of their PatchFrmOrderCntVal values. If the current patch frame is an IRAP frame, all reference patch frames currently in the DPFB (if any) are marked as unused for reference. Otherwise, the following applies. For each long term reference patch frame entry in RefPatchFrmList, when the referred patch frame is a short term reference patch frame, the patch frame is marked as used for long-term reference. Each reference patch frame in the DPFB that is not referred to by any entry in RefPatchFrmList is marked as unused for reference.

Figure 11:
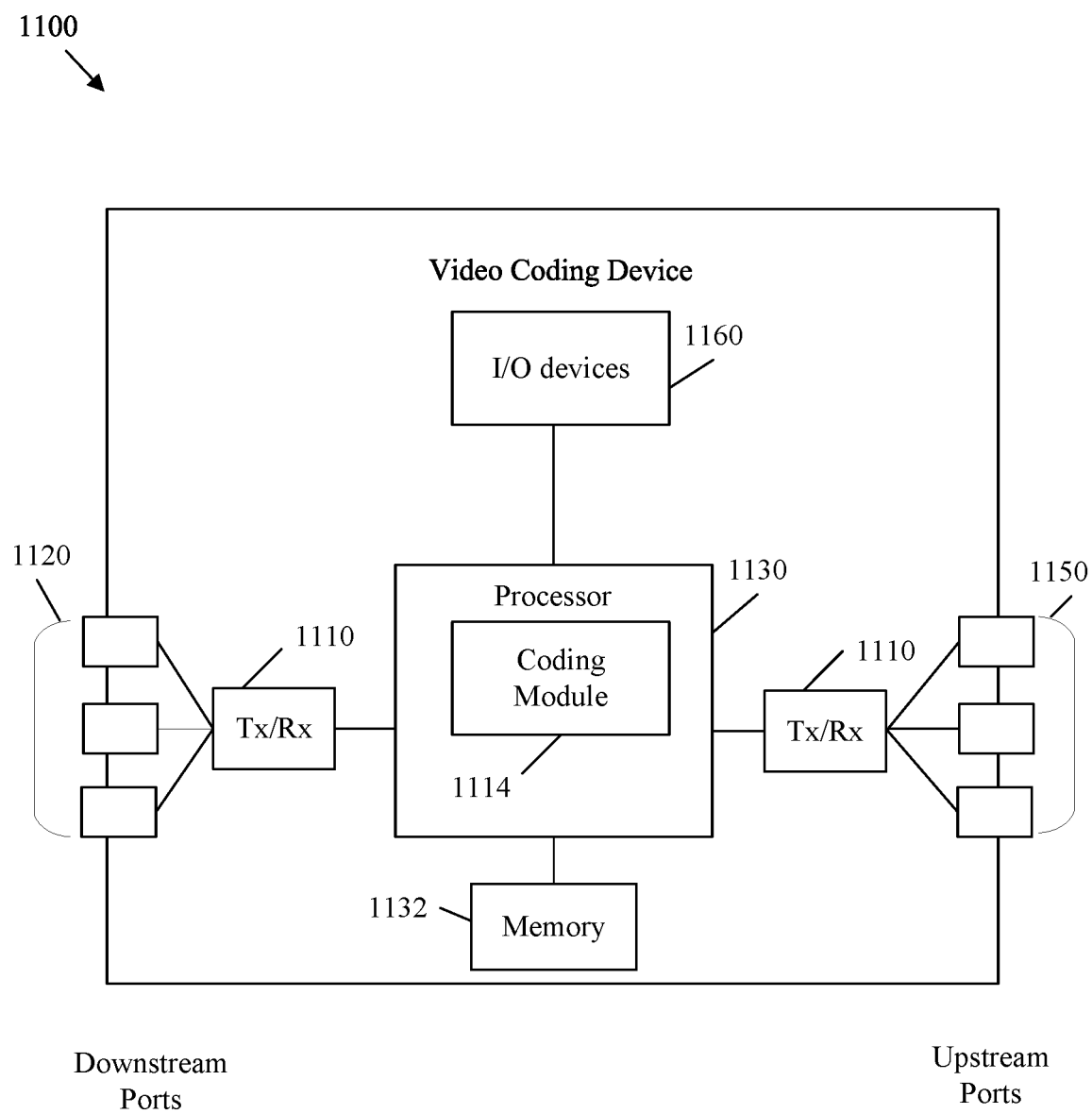
FIG. 11 is a schematic diagram of an example video coding device.

FIG. 11 is a schematic diagram of an example video coding device 1100. The video coding device 1100 is suitable for implementing the disclosed examples/embodiments as described herein. The video coding device 1100 comprises downstream ports 1120, upstream ports 1150, and/or transceiver units (Tx/Rx) 1110, including transmitters and/or receivers for communicating data upstream and/or downstream over a network. The video coding device 1100 also includes a processor 1130 including a logic unit and/or central processing unit (CPU) to process the data and a memory 1132 for storing the data. The video coding device 1100 may also comprise electrical, optical-to-electrical (OE) components, electrical-to-optical (EO) components, and/or wireless communication components coupled to the upstream ports 1150 and/or downstream ports 1120 for communication of data via electrical, optical, or wireless communication networks. The video coding device 1100 may also include input and/or output (I/O) devices 1160 for communicating data to and from a user. The I/O devices 1160 may include output devices such as a display for displaying video data, speakers for outputting audio data, etc. The I/O devices 1160 may also include input devices, such as a keyboard, mouse, trackball, etc., and/or corresponding interfaces for interacting with such output devices.

The processor 1130 is implemented by hardware and software. The processor 1130 may be implemented as one or more CPU chips, cores (e.g., as a multi-core processor), field-programmable gate arrays (FPGAs), application specific integrated circuits (ASICs), and digital signal processors (DSPs). The processor 1130 is in communication with the downstream ports 1120, Tx/Rx 1110, upstream ports 1150, and memory 1132. The processor 1130 comprises a coding module 1114. The coding module 1114 implements the disclosed embodiments described herein, such as methods 100, 1200, and 1300, which may employ point cloud media 500 separated into a set of patches 603 and encoded into an occupancy frame 710, a geometry frame 720, and an atlas frame 730 in a PCC bitstream 1000. Further, the coding module 1114 may implement a HRD 900 that performs a conformance testing mechanism 800 on the PCC bitstream 1000. The coding module 1114 may also implement any other method/mechanism described herein. Further, the coding module 1114 may implement a codec system 200, an encoder 300, and/or a decoder 400. For example, the coding module 1114 can encode a buffering period SEI message, HRD parameters, and/or an atlas frame timing SEI message into the PCC bitstream. Further, the coding module 1114 can initialize a HRD and perform HRD conformance testing on the PCC bitstream based on the buffering period SEI message, HRD parameters, and/or an atlas frame timing SEI message. Further, the coding module 1114 can decode a PCC bitstream that has been tested for HRD conformance based on the buffering period SEI message, HRD parameters, and/or an atlas frame timing SEI message. Hence, coding module 1114 causes the video coding device 1100 to provide additional functionality and/or coding efficiency when coding video data. As such, the coding module 1114 improves the functionality of the video coding device 1100 as well as addresses problems that are specific to the video coding arts. Further, the coding module 1114 effects a transformation of the video coding device 1100 to a different state. Alternatively, the coding module 1114 can be implemented as instructions stored in the memory 1132 and executed by the processor 1130 (e.g., as a computer program product stored on a non-transitory medium).

The memory 1132 comprises one or more memory types such as disks, tape drives, solid-state drives, read only memory (ROM), random access memory (RAM), flash memory, ternary content-addressable memory (TCAM), static random-access memory (SRAM), etc. The memory 1132 may be used as an over-flow data storage device, to store programs when such programs are selected for execution, and to store instructions and data that are read during program execution.

Figure 12:
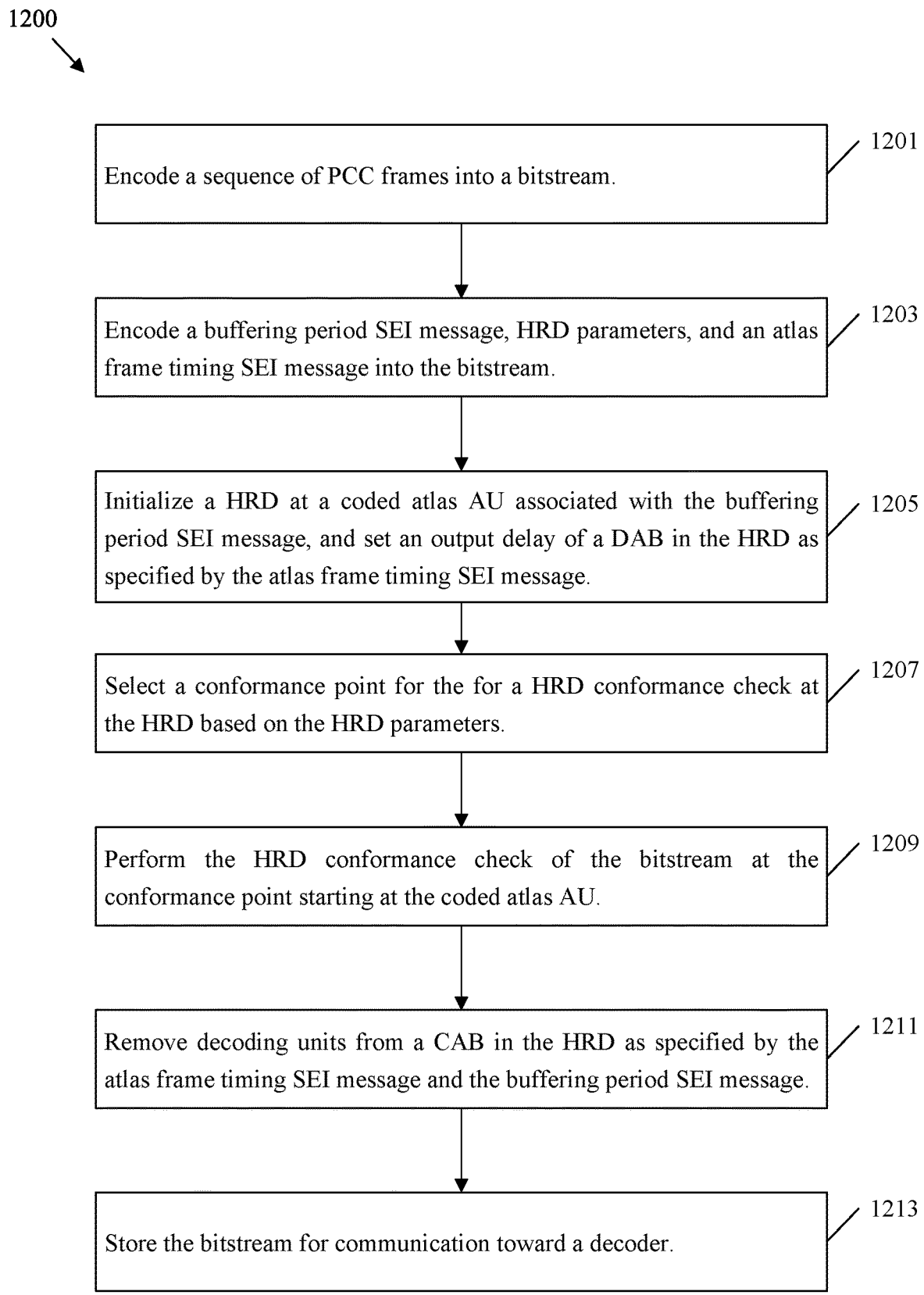
FIG. 12 is a flowchart of an example method of encoding a PCC bitstream for use in initializing a HRD to support HRD conformance tests.

FIG. 12 is a flowchart of an example method 1200 of encoding a PCC bitstream, such as PCC bitstream 1000, for use in initializing a HRD to support HRD conformance tests, for example by a HRD 900 according to conformance testing mechanism 800. Method 1200 may be employed by an encoder, such as a codec system 200, an encoder 300, and/or a video coding device 1100 when performing method 100. As such, the method 1200 may operate on point cloud media 500, which is separated into a set of patches 603 and encoded into an occupancy frame 710, a geometry frame 720, and an atlas frame 730.

Method 1200 may begin when an encoder receives a video sequence including a point cloud that changes dynamically over a plurality of frames and determines to encode that video sequence into a PCC bitstream, for example based on user input. At step 1201, the encoder encodes a sequence of PCC components into a bitstream. Such components may include a sequence of PCC frames in AUs. Further, the PCC frames/AUs may each include an atlas frame, an occupancy frame, a geometry map frame, and/or an attribute frame.

At step 1203, the encoder can encode a buffering period SEI message into the bitstream. The encoder can also encode HRD parameters into the bitstream. In addition, the encoder can encode an atlas frame timing SEI message into the bitstream. As described above, the buffering period SEI message, the HRD parameters, and the atlas frame timing SEI message may provide sufficient information to perform a conformance check on the bitstream.

At step 1205, the encoder may initialize a HRD at a coded atlas AU associated with the buffering period SEI message. For example, the coded atlas AU may include the first PCC AU and/or the first atlas frame in the bitstream, and the HRD may begin performing the conformance check at the AU/frame indicated by the buffering period SEI message. Further, the buffering period SEI message may indicate an initial removal delay related to a CAB in the HRD. The HRD may also set an output delay of a DAB in the HRD as specified by the atlas frame timing SEI message.

At step 1207, the encoder can select a conformance point for an HRD conformance check at the HRD based on the HRD parameters. For example, the HRD conformance check may be a type I conformance test or a type II conformance test. As such, the HRD parameters can be set to a first value to select a first type of conformance point (e.g., the type I conformance test). The HRD conformance check can then be performed on decompressed attribute components, decompressed atlas components, decompressed occupancy map components, and decompressed geometry components contained in the PCC components based on the HRD parameters. Further, the HRD parameters can be set to a second value to select a second type of conformance point (e.g., the type II conformance test). The HRD conformance check can then be performed on reconstructed point clouds generated from the PCC components based on the HRD parameters.

At step 1209, the HRD performs the HRD conformance check of the bitstream starting at the coded atlas AU as indicated by the buffering period SEI message. Further, the HRD performs the conformance check at the conformance point indicated by the HRD parameters.

At step 1211, the HRD may remove decoding units from the CAB in the HRD during the HRD conformance check based on an initial delay specified by the buffering period SEI message and based on a CAB removal delay specified in the atlas frame timing SEI message. As used herein, a decoding unit is any coded component from a bitstream or sub-bitstream that is stored in a buffer, such as the CAB, for decoding. Further, the initial delay may be related to the first frame/AU while the CAB removal delay may vary and may be related to components checked after the first frame/AU.

At step 1213, the encoder and/or the HRD may store the bitstream for communication toward a decoder.

Figure 13:
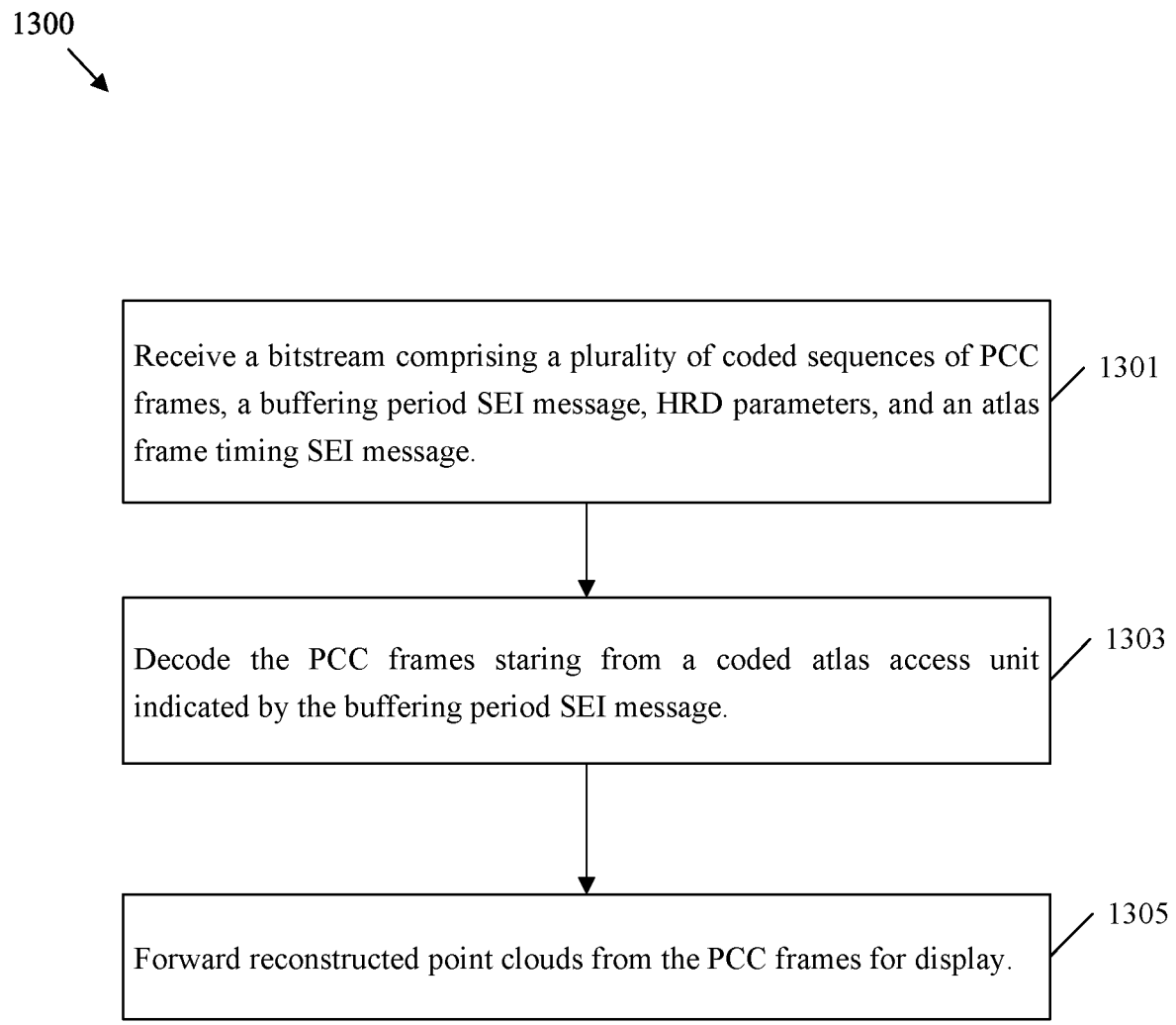
FIG. 13 is a flowchart of an example method of decoding a PCC bitstream resulting from a successful HRD conformance test.

FIG. 13 is a flowchart of an example method 1300 of decoding a PCC bitstream, such as PCC bitstream 1000, resulting from a successful HRD conformance test, for example by a HRD 900 according to conformance testing mechanism 800. Method 1300 may be employed by a decoder, such as a codec system 200, a decoder 400, and/or a video coding device 1100 when performing method 100. As such, the method 1300 may operate on point cloud media 500, which is separated into a set of patches 603 and encoded into an occupancy frame 710, a geometry frame 720, and an atlas frame 730.

Method 1300 may begin when a decoder begins receiving a PCC bitstream of coded data representing a video sequence of point clouds, for example as a result of method 1200. At step 1301, the decoder receives a bitstream comprising a plurality of coded sequences of PCC components. Such components may include a sequence of PCC frames in AUs. Further, the PCC frames/AUs may each include an atlas frame, an occupancy frame, a geometry map frame, and/or an attribute frame. Further, the bitstream may include a buffering period SEI message, HRD parameters, and an atlas frame timing SEI message. The buffering period SEI message may comprise an initial delay for removing decoding units from a CAB in a HRD at an encoder. The HRD parameters may specify a conformance point for a HRD conformance check at the HRD. The conformance point indicates whether the HRD conformance check is performed on decompressed PCC components or reconstructed point clouds. The atlas frame timing SEI message may specify parameters for removing decoding units from a CAB in a HRD and/or an output delay of a DAB in the HRD. The decoder may infer from one or more of these messages that the bitstream has passed a HRD conformance test, and is therefore decodable by the decoder.

At step 1303, the decoder may begin decoding the PCC components starting from a coded atlas access unit indicated by the buffering period SEI message. The PCC components may include PCC frames that each further include an atlas frame, an occupancy frame, a geometry map frame, and/or an attribute frame. The decoder can decode the PCC components and then reconstruct a sequence of point clouds. The decoder can then forward the reconstructed point clouds from the PCC components for display at step 1305.

Figure 14:
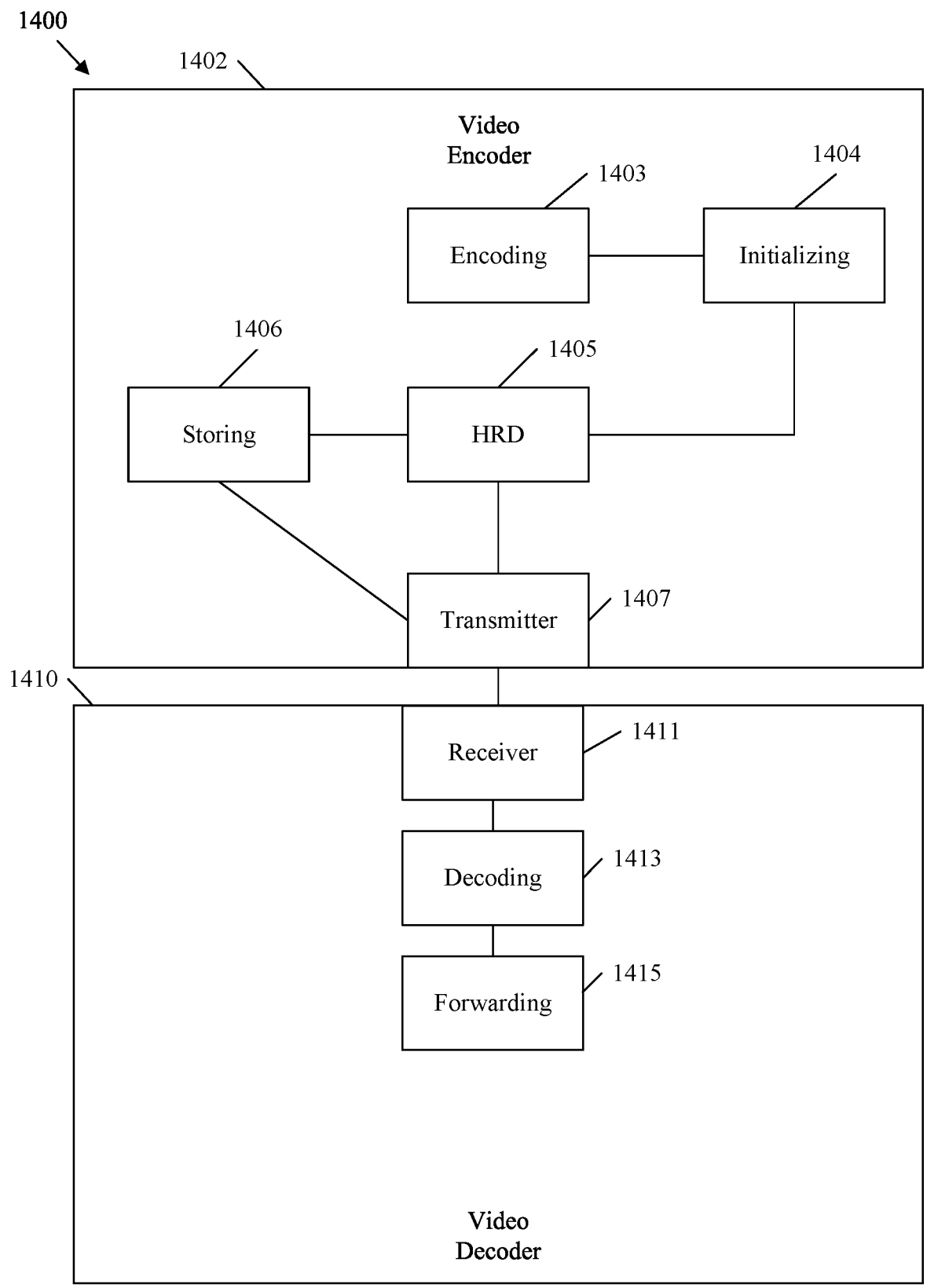
FIG. 14 is a schematic diagram of an example system for coding a PCC bitstream for supporting HRD conformance tests.

FIG. 14 is a schematic diagram of an example system 1400 for coding a PCC bitstream 1000 for supporting HRD conformance tests, for example by a HRD 900 according to conformance testing mechanism 800. System 1400 may be implemented by an encoder and a decoder such as a codec system 200, an encoder 300, a decoder 400, and/or a video coding device 1100. As such, the system 1400 may operate on point cloud media 500, which is separated into a set of patches 603 and encoded into an occupancy frame 710, a geometry frame 720, and an atlas frame 730. Further, system 1400 may be employed when implementing method 100, 1200, and/or 1300.

The system 1400 includes a video encoder 1402. The video encoder 1402 comprises an encoding module 1403 for encoding a sequence of PCC components into a bitstream. The encoding module 1403 is further for encoding a buffering period SEI message into the bitstream. The video encoder 1402 further comprises an initializing module 1404 for initializing a HRD at a coded atlas AU associated with the buffering period SEI message. The video encoder 1402 further comprises a HRD module 1405 for performing a HRD conformance check of the bitstream starting at the coded atlas AU. The video encoder 1402 further comprises a storing module 1406 for storing the bitstream for communication toward a decoder. The video encoder 1402 further comprises a transmitting module 1407 for transmitting the bitstream toward a video decoder 1410. The video encoder 1402 may be further configured to perform any of the steps of method 1200.

The system 1400 also includes a video decoder 1410. The video decoder 1410 comprises a receiving module 1411 for receiving a bitstream comprising a plurality of coded sequences of PCC components and a buffering period SEI message. The video decoder 1410 further comprises a decoding module 1413 for decoding the PCC components starting from a coded atlas access unit indicated by the buffering period SEI message. The video decoder 1410 further comprises a forwarding module 1415 for forwarding reconstructed point clouds from the PCC components for display. The video decoder 1410 may be further configured to perform any of the steps of method 1300.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by an encoder, the method comprising:
   encoding a sequence of point cloud compression (PCC) components into a bitstream according to video point cloud compression (V-PCC), the PCC components containing three dimensional objects represented by three dimensional clouds of points;
   encoding into the bitstream a buffering period supplemental enhancement information (SEI) message and an atlas frame timing SEI message;
   initializing a hypothetical reference decoder (HRD) at a coded atlas access unit (AU) associated with the buffering period SEI message;
   performing a HRD conformance check on the bitstream starting at the coded atlas AU; and
   removing decoding units from a coded atlas buffer (CAB) in the HRD during the HRD conformance check as specified by the atlas frame timing SEI message.

2. The method of claim 1, further comprising encoding HRD parameters into the bitstream.

3. The method of claim 2, further comprising selecting a conformance point for the HRD conformance check at the HRD based on the HRD parameters.

4. The method of claim 2, wherein the HRD conformance check is performed on decoded PCC components when a first type of conformance point is selected based on the HRD parameters.

5. The method of claim 4, wherein the HRD conformance check is performed on reconstructed point clouds from the PCC components when a second type of conformance point is selected based on the HRD parameters.

6. The method of claim 1, further comprising specifying an output timing of a decoded atlas buffer (DAB) in the HRD by the atlas frame timing SEI message.

7. The method of claim 1, wherein the decoding units are removed from the CAB in the HRD based on an initial delay provided by the buffering period SEI message.

8. A method implemented in a decoder, the method comprising:
   receiving a bitstream comprising a plurality of coded sequences of point cloud compression (PCC) components coded according to video point cloud compression (V-PCC), the PCC components containing three dimensional objects represented by three dimensional clouds of points, a buffering period supplemental enhancement information (SEI) message, and an atlas frame timing SEI message specifying parameters for removing decoding units from a coded atlas buffer (CAB) in a hypothetical reference decoder (HRD); and
   decoding the PCC components starting from a coded atlas access unit indicated by the buffering period SEI message.

9. The method of claim 8, wherein the buffering period SEI message comprises an initial delay for removing decoding units from a coded atlas buffer (CAB) in a hypothetical reference decoder (HRD).

10. The method of claim 9, wherein the bitstream further comprises HRD parameters.

11. The method of claim 10, wherein the HRD parameters specify a conformance point for a HRD conformance check at the HRD.

12. The method of claim 11, wherein the conformance point indicates whether the HRD conformance check is performed on decompressed PCC components or reconstructed point clouds.

13. An encoder comprising:
   a processor configured to:
      encode a sequence of point cloud compression (PCC) components into a bitstream according to video point cloud compression (V-PCC), the PCC components containing three dimensional objects represented by three dimensional clouds of points;
      encode into the bitstream a buffering period supplemental enhancement information (SEI) message and an atlas frame timing SEI message;
      perform a hypothetical reference decoder (HRD) conformance check on the bitstream starting at a coded atlas access unit (AU) associated with the buffering period SEI message; and
      remove decoding units from a coded atlas buffer (CAB) in the HRD during the HRD conformance check as specified by the atlas frame timing SEI message.

14. The encoder of claim 13, wherein the encoder is further configured to encode HRD parameters into the bitstream.

15. The encoder of claim 14, wherein the encoder is further configured to select a conformance point for the HRD conformance check at the HRD based on the HRD parameters.

16. The encoder of claim 14, wherein the HRD conformance check is performed on decoded PCC components when a first type of conformance point is selected based on the HRD parameters.

17. The encoder of claim 14, wherein the HRD conformance check is performed on reconstructed point clouds from the PCC components when a second type of conformance point is selected based on the HRD parameters.

18. The encoder of claim 14, wherein the processor is further configured to specify an output timing of a decoded atlas buffer (DAB) in the HRD by the atlas frame timing SEI message.

19. The encoder of claim 13, wherein the decoding units are removed from the CAB in the HRD based on an initial delay provided by the buffering period SEI message.

* * * * *

UNITED STATES PATENT AND TRADEMARK OFFICE
CERTIFICATE OF CORRECTION

| | |
|---|---|
| PATENT NO. | : 11,917,182 B2 |
| APPLICATION NO. | : 17/562760 |
| DATED | : February 27, 2024 |
| INVENTOR(S) | : Ye-Kui Wang et al. |

It is certified that error appears in the above-identified patent and that said Letters Patent is hereby corrected as shown below:

On the Title Page

(71) Applicant:
Delete "Huawei Technologies Co., Ltd., Guangdong, (CN)" and insert -- Huawei Technologies Co., Ltd., Shenzhen, (CN) --

Signed and Sealed this
Thirtieth Day of April, 2024

Katherine Kelly Vidal
*Director of the United States Patent and Trademark Office*